United States Patent
Wang et al.

(10) Patent No.: US 11,711,801 B2
(45) Date of Patent: *Jul. 25, 2023

(54) METHOD AND USER EQUIPMENT FOR TRANSMITTING UPLINK SIGNALS

(71) Applicant: Samsung Electronics Co., Ltd., Suwon-si (KR)

(72) Inventors: Yi Wang, Beijing (CN); Shichang Zhang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

This patent is subject to a terminal disclaimer.

(21) Appl. No.: 17/361,129

(22) Filed: Jun. 28, 2021

(65) Prior Publication Data

US 2021/0329672 A1    Oct. 21, 2021

Related U.S. Application Data

(63) Continuation of application No. 16/307,931, filed as application No. PCT/KR2017/005842 on Jun. 5, 2017, now Pat. No. 11,051,325.

(30) Foreign Application Priority Data

Jun. 6, 2016  (CN) .................. 201610395675.X
Jul. 29, 2016 (CN) .................. 201610617912.2
Aug. 24, 2016 (CN) .................. 201610721162.3

(51) Int. Cl.
*H04W 74/08*    (2009.01)
*H04W 72/1268*  (2023.01)
(Continued)

(52) U.S. Cl.
CPC ... *H04W 72/1268* (2013.01); *H04W 72/0446* (2013.01); *H04W 72/23* (2023.01);
(Continued)

(58) Field of Classification Search
CPC ......... H04W 72/1268; H04W 72/0446; H04W 72/1289; H04W 74/006; H04W 74/0808;
(Continued)

(56) References Cited

U.S. PATENT DOCUMENTS 10,383,165 B2 *  8/2019  Babaei ............... H04L 27/0006
10,660,127 B2 *  5/2020  Yang .................... H04W 16/14
(Continued)

FOREIGN PATENT DOCUMENTS

CN    104994591 A    10/2015
CN    105530080 A     4/2016
(Continued)

OTHER PUBLICATIONS

Office Action dated Apr. 27, 2021 in connection with Chinese Patent Application No. 201610721162.3, 15 pages.
(Continued)

*Primary Examiner* — Michael J Moore, Jr.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method for transmitting uplink signals, a user equipment (UE), and a base station. The UE determines an LBT type and a starting
(Continued)

position of signal transmission according to scheduling information and LBT type of a previous subframe, a current subframe, and a subsequent subframe and whether there is a gap between these subframes.

6 Claims, 21 Drawing Sheets

(51) Int. Cl.
H04W 72/23 (2023.01)
H04W 72/0446 (2023.01)
H04W 74/00 (2009.01)
H04W 16/14 (2009.01)
H04W 24/02 (2009.01)
H04W 84/04 (2009.01)

(52) U.S. Cl.
CPC ..... *H04W 74/006* (2013.01); *H04W 74/0808* (2013.01); *H04W 16/14* (2013.01); *H04W 24/02* (2013.01); *H04W 84/045* (2013.01)

(58) Field of Classification Search
CPC ..... H04W 16/14; H04W 24/02; H04W 72/14; H04W 84/045
See application file for complete search history.

(56) References Cited

U.S. PATENT DOCUMENTS

| | | | | |
|---|---|---|---|---|
| 10,880,922 | B2* | 12/2020 | Koorapaty | H04W 74/006 |
| 2014/0341018 | A1 | 11/2014 | Bhushan et al. | |
| 2015/0249980 | A1 | 9/2015 | You et al. | |
| 2016/0338053 | A1* | 11/2016 | Park | H04W 74/0808 |
| 2017/0135128 | A1* | 5/2017 | Yerramalli | H04W 74/0808 |
| 2017/0230838 | A1* | 8/2017 | Yerramalli | H04W 72/042 |
| 2017/0280475 | A1* | 9/2017 | Yerramalli | H04W 16/14 |
| 2017/0289869 | A1* | 10/2017 | Nogami | H04L 5/0094 |
| 2017/0325225 | A1* | 11/2017 | Dinan | H04W 72/0446 |
| 2017/0325258 | A1* | 11/2017 | Nogami | H04J 11/00 |
| 2017/0339721 | A1* | 11/2017 | Mukherjee | H04W 72/1247 |
| 2019/0037600 | A1* | 1/2019 | Urabayashi | H04W 74/006 |
| 2019/0053222 | A1* | 2/2019 | Bhorkar | H04W 72/1284 |
| 2019/0081820 | A1* | 3/2019 | Urabayashi | H04L 27/0006 |
| 2019/0150182 | A1* | 5/2019 | Koorapaty | H04W 74/0808 370/329 |
| 2019/0150196 | A1* | 5/2019 | Koorapaty | H04L 1/1832 370/329 |
| 2019/0159253 | A1* | 5/2019 | Koorapaty | H04W 74/0808 |
| 2019/0182865 | A1* | 6/2019 | Falahati | H04L 1/1887 |
| 2019/0200379 | A1* | 6/2019 | Wang | H04W 72/1289 |
| 2019/0313450 | A1* | 10/2019 | Mukherjee | H04W 16/14 |
| 2019/0342915 | A1* | 11/2019 | Kim | H04W 72/0406 |
| 2020/0314896 | A1* | 10/2020 | Koorapaty | H04W 72/23 |
| 2020/0336987 | A1* | 10/2020 | Mukherjee | H04W 74/0808 |
| 2020/0404688 | A1* | 12/2020 | Park | H04W 72/1268 |
| 2022/0247543 | A1* | 8/2022 | Fu | H04L 5/0055 |

FOREIGN PATENT DOCUMENTS

| | | | |
|---|---|---|---|
| CN | 105611637 A | 5/2016 | |
| EP | 3453216 A1 | 3/2019 | |
| WO | 2016/071741 A1 | 5/2016 | |
| WO | 2016/081375 A1 | 5/2016 | |
| WO | WO-2017199205 A1 * | 11/2017 | ....... H04W 72/042 |
| WO | 2017/213393 A1 | 12/2017 | |

OTHER PUBLICATIONS

ZTE, "Discussion on UL Scheduling for LAA", 3GPP TSG RAN WG1 Meeting #85, May 23-27, 2016, R1-164575, 5 pages.
Ericsson, "On Signaling of UL Channel Access Parameters", 3GPP TSG RAN WG1 Meeting #85, May 23-27, 2016, R1-165159, 6 pages.
Supplementary European Search Report dated Nov. 20, 2019 in connection with European Patent Application No. 17 81 0516, 9 pages.
International Search Report dated Sep. 12, 2017 in connection with International Patent Application No. PCT/KR2017/005842, 3 pages.
Written Opinion of the International Searching Authority dated Sep. 12, 2017 in connection with International Patent Application No. PCT/KR2017/005842, 9 pages.
Samsung, "Discussion on shared MCOT and LBT procedure", 3GPP TSG RAN WG1 #85, May 23-27, 2016, 4 pages, R1-164752.
LG Electronics, "Further details on channel access in LAA UL", 3GPP TSG RAN WG1 meeting #85, May 23-27, 2016, 8 pages, R1-164503.
Huawei, HiSilicon, "Discussion on the application of LBT options in eLAA", 3GPP TSG RAN WG1 85 Meeting, May 23-27, 2016, 4 pages, R1-164071.
Intel Corporation, "UL LBT details", 3GPP TSG RAN WG1 Meeting #84bis, Apr. 11-15, 2016, 6 pages, R1-162359.

* cited by examiner

− Prior Art −

METHOD AND USER EQUIPMENT FOR TRANSMITTING UPLINK SIGNALS

CROSS-REFERENCE TO RELATED APPLICATIONS

This application is a continuation of U.S. patent application Ser. No. 16/307,931 filed on Dec. 6, 2018, which is a 371 of International Application No. PCT/KR2017/005842 filed on Jun. 5, 2017, which claims priority to Chinese Patent Application No. 201610395675.X filed on Jun. 6, 2016, Chinese Patent Application No. 201610617912.2 filed on Jul. 29, 2016, and Chinese Patent Application No. 201610721162.3 filed on Aug. 24, 2016, the disclosures of which are herein incorporated by reference in their entirety.

BACKGROUND

1. Field

The present disclosure relates to mobile communications, and particularly to a method and user equipment for transmitting uplink signals.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the conflict between the demand of users for high-bandwidth wireless services and the scarcity of spectrum resources becoming increasingly severe, mobile operators are beginning to consider unlicensed frequency bands as a supplement to licensed frequency bands. Therefore, the research on deployment of long term evolution (LTE) in the unlicensed frequency bands has been put on the agenda. The 3rd generation partnership project (3GPP) has begun to study an effective carrier aggregation of the unlicensed frequency bands and the licensed frequency bands, as shown in FIG. 1, and how to effectively improve the spectrum utilization of the whole network without significantly affecting other technologies in the unlicensed frequency bands is a technical problem urgently to be solved.

The unlicensed frequency bands are usually allocated for some other purpose, such as radar or 802.11 series of wireless fidelity (WiFi). As a result, because interference between the unlicensed frequency bands is indefinite, the quality of service (QoS) of LTE transmissions is often difficult to guarantee. However, the unlicensed frequency bands still can be used for data transmission with low QoS requirements. Here, an LTE system deployed in an unlicensed frequency band is referred to as a licensed assisted access (LAA) system. In the unlicensed frequency band, how to avoid mutual interference between the LAA system and other wireless systems such as radar or WiFi is a key issue.

Clear channel assessment (CCA) is a mechanism to avoid collision commonly used in the unlicensed frequency bands. A mobile station (STA) must detect a radio channel before sending a signal, and the STA can only send the signal over the radio channel when it detects that the radio channel is idle. This mechanism is called a listen-before-talk (LBT) mechanism. LAA also needs to follow a similar mechanism to ensure less interference with other signals. A simple method is that an LAA device (a base station or a user equipment) dynamically switches according to a CCA result, namely, performing transmission when a channel is idle or not performing transmission when a channel is busy.

For uplink transmission in an unlicensed frequency band, a UE determines a subframe which can be used to transmit an uplink channel/signal, an LBT type, and related parameters, and information such as resource allocation in traditional art according to scheduling signaling (UL grant) received from a base station.

In order to make full use of resources of an occupied channel after the UE uses the channel to successfully complete one LBT, the base station may schedule consecutive uplink subframes for the same UE. In order to save the signaling overhead, the base station may perform multi-subframe scheduling, i.e., scheduling multiple consecutive uplink subframes by one UL grant. Of course, multi-subframe scheduling will sacrifice some flexibility, such as multiple sub-frames need to use the same resource allocation, and hybrid automatic repeat request (HARQ) scheduling flexibility. Thus, the base station may also perform single-subframe scheduling, i.e., one-to-one scheduling multiple consecutive uplink subframes by multiple UL grants. The multiple UL grants may be transmitted in a same downlink subframe, or may be transmitted in different downlink subframes. Of course, the base station may also support both multi-subframe scheduling and single-subframe scheduling to schedule multiple uplink subframes of a UL burst.

The UE performs a corresponding LBT detection in the scheduled uplink subframe according to the LBT type and the parameters indicated by the base station. It is unnecessary for the UE to perform LBT between multiple uplink subframes in a UL burst, and the UE transmits the multiple uplink subframes continuously. But in a start subframe of a UL burst, the UE is required to perform a corresponding LBT detection according to information indicated by the base station. Due to the presence of hidden terminals, the UE may miss some UL grant information so that the UE cannot determine LBT of a corresponding uplink subframe based only on received UL grant information. At the same time, if the base station does not indicate an LBT type of a subframe in the UL burst by UL grant explicitly, for example, the base station only indicating 25 μs or Cat-4 LBT, but the base station still wants the UE not to perform LBT within the UL burst, then it is necessary to define a rule understood by both the base station and the UE to indicate the LBT type implicitly.

In addition, to indicate the LBT type more flexibly, the base station may use cell common signaling, e.g., cell common radio network temporary identity (CC-RNTI)-scrambled common physical downlink control channel (PDCCH) (C-PDCCH) to indicate the LBT type or a change of the LBT type. Then it is an issue yet to be solved regarding how to determine the LBT based on the LBT type indicated by the UL grant and/or based on the LBT type indicated by the C-PDCCH under the situation described in the foregoing.

It should be noted that the above description of the technical background is only intended to facilitate a clear and complete description of the technical solution of the present disclosure and to facilitate understanding by those skilled in the art. The technical solutions described above should not be construed as well known to those skilled in the art, simply because these solutions are set forth in the background part of the present disclosure.

SUMMARY

The present disclosure provides a method for determining LBT and a method for transmitting uplink signals. To be more specific, the present disclosure provides a method for transmitting uplink signals, a user equipment (UE), and a base station to solve a problem regarding how a UE determines LBT and an uplink signal starting position when multiple consecutive uplink subframes of the UE are scheduled.

In the present disclosure, a method of how to determine an LBT type when the UE misses at least one piece of scheduling signaling and a method of how to determine an LBT type when the UE does not miss scheduling signaling. Through the methods of the present disclosure, the UE performs transmission continuously in continuously scheduled subframes without performing additional LBT, which improves a signal transmission probability, and enables the UE to perform suitable LBT when the UE does not receive a part of scheduling signaling properly. In this way, influences of the UE to other devices can be avoided, and a transmission probability of the UE can be guaranteed, so that overall network efficiency is improved.

To achieve the foregoing objects, the present disclosure provides the following technical schemes:

A method for transmitting uplink signals, including:
receiving scheduling signaling for scheduling a current subframe and/or signaling containing a listen-before-talk (LBT) type indication;
determining an LBT type of the current subframe based on the scheduling signaling for scheduling the current subframe, and/or the signaling containing the LBT type indication received, and/or received scheduling signaling for scheduling an adjacent previous subframe, and/or received scheduling signaling for scheduling an adjacent subsequent subframe; and
performing LBT for the current subframe based on the determined LBT type, and starting to transmit an uplink signal from the current subframe.

Preferably, the signaling containing the LBT type indication is a uplink grant (UL grant) which is scheduling signaling for scheduling the current subframe and/or the previous subframe, and/or cell common control signaling.

Preferably, when the signaling containing the LBT type indication is only a UL grant, a user equipment (UE) determines whether there is a gap between the current subframe and the previous subframe according to a received UL grant for scheduling the current subframe and a received UL grant for scheduling the previous subframe, so as to determine the LBT type of the current subframe.

Preferably, in response to determining that there is no gap between the current subframe and the previous subframe, and that the UE has transmitted a scheduled signal in the previous subframe, the UE does not need to perform LBT in the current subframe and transmits a scheduled signal from a starting position of the current subframe.

Preferably, in response to determining that there is no gap between the current subframe and the previous subframe, and that the UE has not transmitted a scheduled signal in the previous subframe, then if an LBT type indicated by the UL grant for scheduling the current subframe is no LBT which means not performing LBT, then the LBT type of the current subframe is a predefined default LBT type; and/or
in response to determining that the LBT type indicated by the UL grant for scheduling the current subframe is performing LBT, then the LBT type of the current subframe is the LBT type indicated by the UL grant for scheduling the current subframe.

Preferably, in response to determining that there is a gap between the current subframe and the previous subframe, then the LBT type of the current subframe is an LBT type indicated by the UL grant for scheduling the current subframe.

Preferably, if the signaling containing the LBT type indication is only a UL grant, and the UE has not received a UL grant for scheduling the previous subframe, then the UE determining the LBT type of the current subframe according to a UL grant for scheduling the current subframe comprises:

if an LBT type that can be indicated by a UL grant containing no LBT, and an LBT type indicated by the UL grant of the current subframe being no LBT, then the UE determining the LBT type of the current subframe is a predefined default LBT type, or the UE further determining whether the previous subframe of the current subframe is a downlink subframe, and if the previous subframe of the current subframe being a downlink subframe, then the UE not performing LBT for the current subframe, or otherwise, the LBT type of the current subframe being the predefined default LBT type;

or, if an LBT type that can be indicated by a UL grant containing no LBT, and the LBT type indicated by the UL grant of the current subframe being performing LBT, then the LBT type of the current subframe being an LBT type indicated by the UL grant for scheduling the current subframe; or if an LBT type that can be indicated by a UL grant containing no LBT, and the LBT type indicated by the UL grant of the current subframe being performing LBT, then the LBT type of the current subframe being the LBT type indicated by the UL grant for scheduling the current subframe.

Preferably, the signaling containing the LBT type indication is an uplink grant (UL grant) which is scheduling signaling for scheduling the current subframe and/or the previous subframe, and/or cell common control signaling.

Preferably, in multi-subframe scheduling, if there is a gap in one or more uplink subframes among multiple consecutive uplink subframes starting from the current subframe, then a starting position of the one or more uplink subframes having the gap among the multiple consecutive uplink subframes is a second symbol of an uplink subframe that has the gap.

Preferably, if the signaling containing the LBT type indication at least contains the cell common control signaling, the UE determines whether there is a gap between the current subframe and the subsequent subframe according to a received UL grant for scheduling the current subframe and a received UL grant for scheduling the subsequent adjacent subframe, and determines the LBT type of the current subframe and a signal starting position of the current subframe according to an LBT type indicated by the cell common control signaling.

Preferably, if multiple consecutive uplink subframes without a gap starting from the current subframe belong to a same LBT type indicated by the cell common control signaling, then the LBT type of the current subframe is an LBT type indicated by the cell common control signaling.

Preferably, in multi-subframe scheduling, if there is a gap in one or more uplink subframes among multiple consecutive uplink subframes starting from the current subframe, and all consecutive uplink subframes without a gap before a first gap belong to a same LBT type indicated by the cell common control signaling, then the LBT type of the current subframe is the LBT type indicated by the cell common signaling. Preferably, a starting position of the one or more uplink subframes with the gap among the multiple consecutive uplink subframes is a second symbol of an uplink subframe having the gap.

Preferably, if multiple consecutive uplink subframes without a gap starting from the current subframe belong to different LBT types indicated by the cell common control signaling, then the LBT type of the current subframe is an LBT type indicated by previous cell common control signaling before newly received cell common control signaling, or the LBT type of the current subframe is a predefined default LBT type, or the LBT type of the current subframe is a most conservative LBT type of the multiple consecutive uplink subframes without a gap.

Preferably, in multi-subframe scheduling, if there is a gap in one or more uplink subframes among multiple consecutive uplink subframes starting from the current subframe, and all consecutive uplink subframes without a gap before a first gap belong to different LBT types indicated by the cell common control signaling, then the LBT type of the current subframe is the LBT type indicated by the UL grant for scheduling the current subframe. Preferably, a starting position of the one or more uplink subframes with the gap among the multiple consecutive uplink subframes is a second symbol of an uplink subframe having the gap.

Preferably, when the signaling containing the LBT type indication at least includes the cell common control signaling and the UE does not receive a UL grant for scheduling a previous subframe, an LBT type of the current subframe is an LBT type indicated by the cell common control signaling.

Preferably, if multiple consecutive uplink subframes without a gap starting from the current subframe belong to different LBT types indicated by the cell common control signaling, then the LBT type of the current subframe is an LBT type indicated by previous cell common control signaling before newly received cell common control signaling, or the LBT type of the current subframe is a predefined default LBT type, or the LBT type of the current subframe is a most conservative LBT type of the multiple consecutive uplink subframes without a gap.

Preferably, the predefined default LBT type is a fourth type Cat-4 LBT.

Preferably, when at least one of M1 continuously scheduled subframes scheduled by multi-subframe scheduling signaling is larger than a current maximum channel occupancy time indicated by cell common control signaling, and if a subframe for carrying aperiodic CSI and/or a subframe for transmitting SRS determined according to the M1 subframes scheduled are larger than the current maximum channel occupancy time indicated by the cell common control signaling, corresponding subframes, or the subframe for carrying aperiodic CSI determined according to the M2 continuously scheduled subframes determined according to the maximum channel occupancy time, and/or the subframe for transmitting SRS.

Preferably, if the UE receives the cell common control signaling, and the subframe for carrying aperiodic CSI determined according to the M2 continuously scheduled subframes that can be transmitted determined according to the largest occupation time and the subframe for transmitting SRS is not smaller than a minimum uplink transmission time delay of the UE, the UE can carry the aperidoic CSI subframe in the newly determined subframe, and/or transmit SRS, or otherwise, the UE will not perform transmission.

The present disclosure further provides a user equipment, including:

a first receiving module to receive scheduling signaling, wherein the scheduling signaling at least comprises LBT indication information; and a first uplink signal transmission module to determine an LBT type of a current subframe based on scheduling signaling of the current subframe, and/or scheduling signaling of a previous subframe, and transmit an uplink signal in an uplink carrier.

According to the present disclosure, in continuously scheduled subframes, after the first subframe passes LBT, the UE may transmit the following subframes continuously without performing additional LBT or selecting suitable LBT, which improves a signal transmission probability, and enables the UE to perform suitable LBT when the UE does not receive a part of scheduling signaling properly. In this way, influences of the UE to other devices can be avoided, and a transmission probability of the UE can be guaranteed, so that overall network efficiency is improved.

DETAILED DESCRIPTION

To solve the technical problems existing in traditional art, the present disclosure provides a method for transmitting uplink signals, a user equipment, and a base station. To be more specific, the present disclosure provides a method for determining LBT and a method for transmitting uplink signals.

In an unlicensed frequency band, in order to increase the chances of UEs occupying a channel, a base station may schedule consecutive uplink subframes for a same UE. All that is needed for a UE to transmit multiple uplink subframes consecutively is that the UE should pass an LBT detection on the first uplink subframe of the multiple consecutive uplink subframes, without performing an LBT detection in the middle of the multiple consecutive uplink subframes. The base station may perform multi-subframe scheduling, e.g., scheduling multiple consecutive uplink subframes by one UL grant; or scheduling multiple consecutive uplink subframes by multiple UL grants, e.g., scheduling first 4 consecutive subframes by one UL grant, and scheduling adjacent 2 consecutive subframes by another UL grant, and the 6 uplink subframes are continuously scheduled; or the base station may perform single-subframe scheduling, e.g., separately scheduling multiple consecutive uplink subframes by multiple UL grants; or the base station may perform multi-subframe and single-subframe scheduling, e.g., scheduling first 4 consecutive subframes by one UL grant, and scheduling the fifth subframe by another UL grant. For the convenience of description, multiple consecutive uplink subframes are referred to as an uplink UL burst. There is no gap between these uplink subframes, when they are scheduled. For example, situations where the first symbol of a subframe in the middle is blanked or the last symbol of a subframe in the middle is blanked will not occur.

Figure 19:
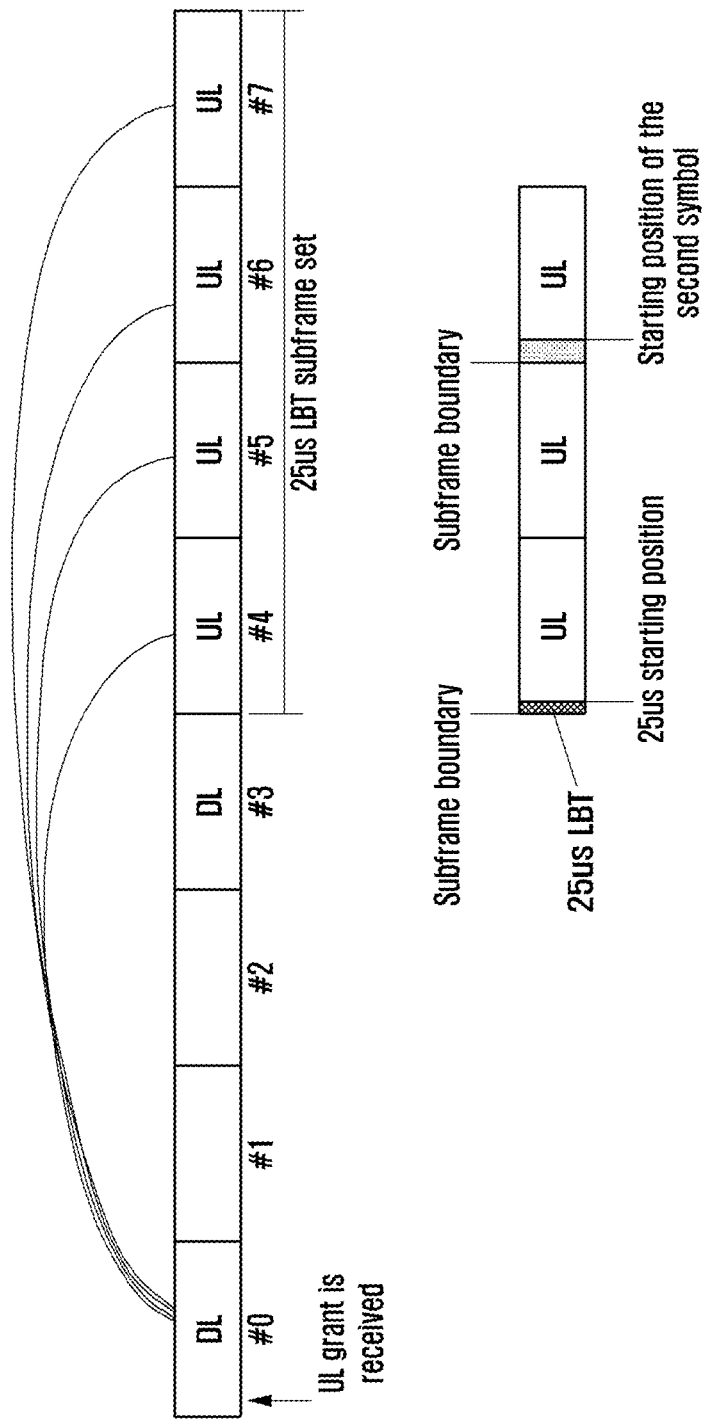
FIG. 19 is a schematic diagram showing how a UE determines an uplink subframe starting position.

In the case of multi-subframe scheduling, there is a case where one or more subframes in the middle of multiple consecutive uplink subframes have/has a gap/gaps, in addition to the case where there is no gap between continuously scheduled subframes described above. For example, which one or more of multiple consecutive subframes having a gap/gaps may be dynamically indicated by higher layer signaling configuration in conjunction with a UL grant, or by a predefined rule of the system, or by UL grants. The size of a gap may be determined by one of the following two modes:

Mode 1: the size of a gap may be predefined. For example, the first SC-FDMA symbol of a corresponding subframe is blanked, and the starting position is the second SC-FDMA symbol (#1 SC-FDMA symbol), independent of a starting position of the first subframe among multiple consecutive subframes indicated by a UL grant. As shown in FIG. 19, a UL grant schedules four consecutive subframes which are all within the maximum channel occupancy time (MCOT). A starting position indicated by the UL grant is 25 μs, an LBT type is 25 μs LBT, and among the 4 continuously scheduled subframes, there is a gap between the second and the third subframes. Then, the starting position of the first subframe is 25 μs after the start of the uplink subframe boundary, and the UE performs 25 μs LBT. If the LBT detection is passed, the first and second subframes can be transmitted continuously. The third subframe starts from the second SC-FDMA symbol of the subframe, and the UE performs 25 μs LBT before start of transmission.

Mode 2: The size of a gap can be determined by a starting position indicated in a UL grant in conjunction with a predefined threshold. For example, defining the threshold is X microseconds (μs), if a time difference between a starting position of the first subframe of multiple consecutive subframes indicated in a UL grant and an uplink subframe boundary of the first subframe is larger than and/or equal to Xμs, the starting position of the subframes among the multiple consecutive subframes is determined according to the starting position of the first subframe of the multiple consecutive subframes indicated in the UL grant, or otherwise, the starting position is the second SC-FDMA symbol, or the starting position is at a position Xμs later than the subframe boundary of the corresponding subframe. For example, the UL grant schedules 4 consecutive subframes which are all within the MCOT. The starting position indicated by the UL grant is 25 μs, an LBT type is 25 μs LBT, and among the 4 continuously scheduled subframes, there is a gap between the second and third subframes. Assume that the threshold X is 60 μs. Then the starting position of the third subframe is a position of 60 μs within the first symbol, or the starting position is the second symbol, because 25 μs indicated by the UL grant<60 μs.

The following embodiments of the present disclosure are for the case where there is no gap in consecutive subframes.

When a base station uses multiple UL grants to schedule different uplink subframes of an uplink UL burst, the base station may indicate No LBT, such that a UE does not need to perform LBT in these subframes, but performs transmission continuously. However, if the UE misses a UL grant indicating the first uplink subframe of the UL burst, the UE cannot perform a corresponding LBT detection according to No LBT. For example, the base station transmits two UL grants scheduling an uplink subframe n and an uplink subframe n+1, respectively, and the base station indicates that an LBT type of the subframe n is Cat-4 LBT, and that an LBT type of the subframe n+1 is no LBT. If the UE has not detected the UL grant of the subframe n, the UE cannot perform a corresponding LBT detection according to No LBT of the subframe n+1. Also, for example, the base station may not indicate No LBT, but instead indicate 25 μs or Cat 4 LBT, but the base station also expects the UE to determine that the UE does not need to perform LBT in the current subframe according to the predefined rule. For example, the base station sends 2 UL grants to scheduling the uplink subframe n and the uplink subframe n+1, respectively, and the base station indicates that the LBT type of the subframe n is Cat-4 LBT, and the LBT type of the subframe n+1 is also Cat 4 LBT. Then, in this case, if the UE misses the UL grant of the subframe n, the UE still can perform LBT according to the LBT type indicated by the UL grant of the subframe n+1. However, if the UE has detected both the UL grant of the subframe n and the UL grant of the subframe n+1, and the base station expects there is no LBT between the subframe n and the subframe n+1 continuously scheduled, then a rule needs to be defined accordingly so that the UE will not perform LBT in the subframe n+1.

In addition, if the base station can also indicate that some uplink subframes belong to one kind of LBT type and other uplink subframes belong to another type of LBT by cell common signaling, according to the latest downlink transmission situation, and the UE also needs to determine LBT types of the respective uplink subframes and a starting position of an uplink signal of the uplink subframes when the consecutive uplink subframes continuously scheduled belong to different LBT types.

In the present disclosure, a detailed solution is given to the above problems.

In the present disclosure, when transmitting a corresponding uplink signal is described, if it is not clearly described that the uplink signal can be transmitted without an LBT, then it means that the uplink signal is transmitted after an LBT is completed. If the LBT is failed, the uplink signal will not be transmitted.

In the present disclosure, when performing an LBT in a subframe is described, the starting position or the ending position of the LBT is not limited to a boundary where a subframe starts, but just to indicate that LBT should be performed for transmitting an uplink signal in a certain subframe. A detailed ending position of the LBT is determined according to a starting position of an uplink channel/signal of a certain subframe.

In the present disclosure, when transmitting a corresponding uplink signal is described, if it is not clearly described that the uplink signal can be transmitted without an LBT, then it means that the uplink signal is transmitted after an LBT is completed. If the LBT is failed, the uplink signal will not be transmitted.

In the present disclosure, when performing an LBT in a subframe is described, the starting position or the ending position of the LBT is not limited to a boundary where a subframe starts, but just to indicate that LBT should be performed for transmitting an uplink signal in a certain subframe. A detailed ending position of the LBT is determined according to a starting position of an uplink channel/signal of a certain subframe.

Embodiment 1

Figure 1:
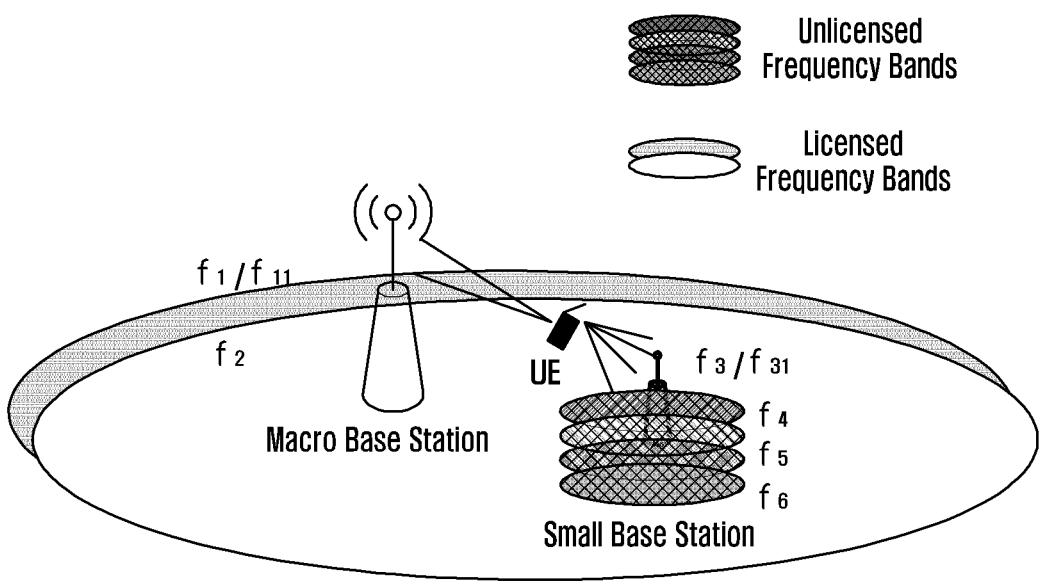
FIG. 1 is a schematic diagram illustrating an LAA system where licensed frequency bands and unlicensed frequency bands form a network.
Figure 2:
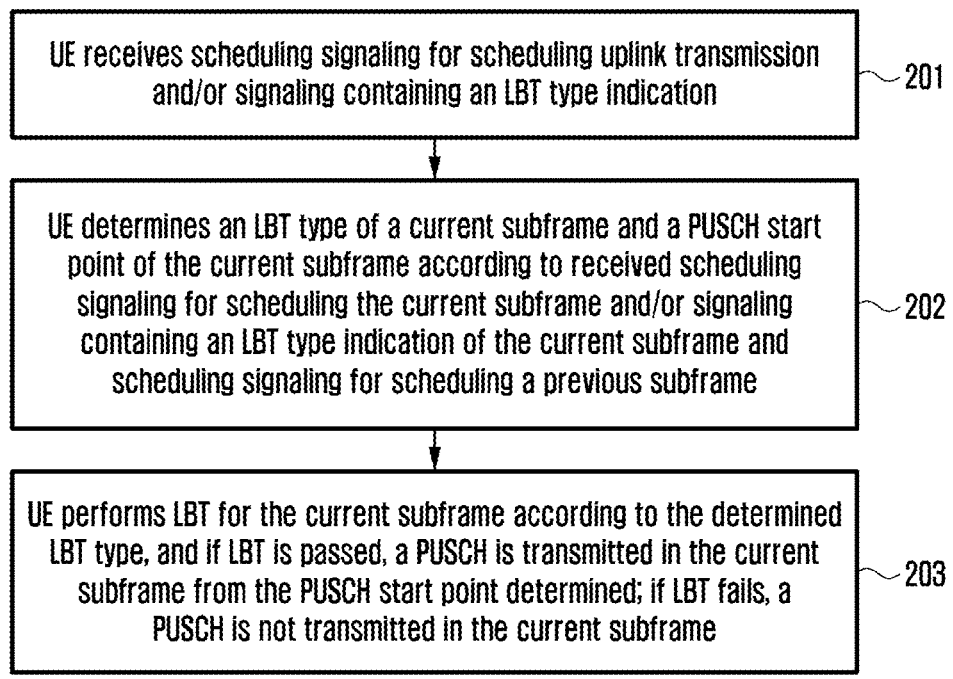
FIG. 2 is a flowchart of a method for transmitting uplink signals according to Embodiment 1 of the present disclosure.

FIG. 2 is a flowchart of a method for transmitting uplink signals according to an embodiment of the present disclosure. The method includes the following procedures.

Step 201: a UE receives scheduling signaling for scheduling uplink transmission and/or signaling containing an LBT type indication.

Preferably, scheduling signaling for scheduling uplink transmission may be a UL grant.

Preferably, scheduling signaling for scheduling uplink transmission may be a UL grant for single-subframe scheduling, or a UL grant for multi-subframe scheduling.

Preferably, scheduling signaling for scheduling uplink transmission may contain an LBT type indication, e.g., 25 μs LBT or Cat 4 LBT, or no LBT.

Preferably, scheduling signaling for scheduling uplink transmission also contains LBT-related information, such as LBT priority, and/or information related to adjustment of contention window size. Information related to adjustment of contention window size may be explicit, for example, the base station may explicitly indicate a size of a contention window, or information related to adjustment of contention window size may be implicit, for example, the base station may send information that indirectly/directly indicates ACK/NACK information, so that the UE can determine the size of the CW based on this information. The present disclosure is not limited thereto. The UE can use information mentioned herein to determine parameters of Cat-4 LBT. LBT-related information and the LBT type indication in scheduling signaling may be separate bit indications, or may be coded in combination, which is not limited by the present disclosure.

Preferably, signaling containing the LBT type indication may be cell common signaling, such as a C-PDCCH. Cell common signaling indicates a specific LBT type, and the present disclosure is not limited thereto.

Preferably, whether the C-PDCCH indicates LBT information may be configured by a higher layer, or may be pre-defined by the system.

Step 202: an LBT type of a current subframe and a PUSCH starting position of the current subframe are determined according to received scheduling signaling for scheduling the current subframe and/or signaling containing an LBT type indication of the current subframe and scheduling signaling for scheduling a previous subframe.

Preferably, the UL grant contains LBT type information, and the C-PDCCH does not contain LBT type information.

Preferably, the UL grant contains LBT type information, and the C-PDCCH contains LBT type information.

Preferably, the UL grant does not contain LBT type information, and the C-PDCCH contains LBT type information.

In this step, two situations where (1) the UL grant contains LBT type information, and the C-PDCCH contains or does not contain LBT type information; and (2) the UL grant does not contain LBT type information, and the C-PDCCH contains LBT type information will be described in the following.

Preferably, the PUSCH starting position of the current subframe is determined according to a starting position indicated by the UL grant for scheduling the current subframe. In the case of multi-subframe scheduling, if it is the first subframe of multiple subframes, then the PUSCH starting position of the current subframe is a starting position indicated by the UL grant, and if it is not the first subframe of the multiple subframes, then the PUSCH starting position of the current subframe is the first symbol of the subframe, i.e., #0 symbol, or the PUSCH starting position is determined according to the starting position indicated by the UL grant, which cases are collectively referred to as the starting position indicated by the UL grant in the following description.

(1) If the UL grants contains the LBT indication, then the UE may determine the LBT type and/or the PUSCH starting position of the current subframe according to LBT information indicated by the UL grant, and/or LBT information indicated by the C-PDCCH, and whether the UL grant of the previous subframe is received, and whether is a gap between the previous subframe and the current subframe.

(1.1) If the UL grant of the previous subframe is not received and the C-PDCCH containing LBT indication information is not received thereafter, If an LBT type that can be indicated by a UL grant includes
No LBT and the LBT type indicated by the UL grant of the current subframe is No LBT, the UE may determine the LBT type and a starting position of an uplink channel/signal according to one of the following two modes:

Mode 1: the LBT type of the current subframe is determined as a predefined default LBT type, such as Cat-4 LBT. The UE may determine Cat-4 LBT parameters according to the received UL grant. For example, the UE determines the Cat-4 LBT parameters, e.g., generating a backoff counter, according to the LBT priority of the current subframe and information related to adjustment of the CWS. The PUSCH starting position is determined according to the starting position indicated by the current subframe. The indicated starting position is indicated by the UL grant, or determined according to a predefined rule, or determined according to higher layer signaling and/or the UL grant, or determined according to cell common/user group information. Indication information will not be elaborated herein.

Figure 3:
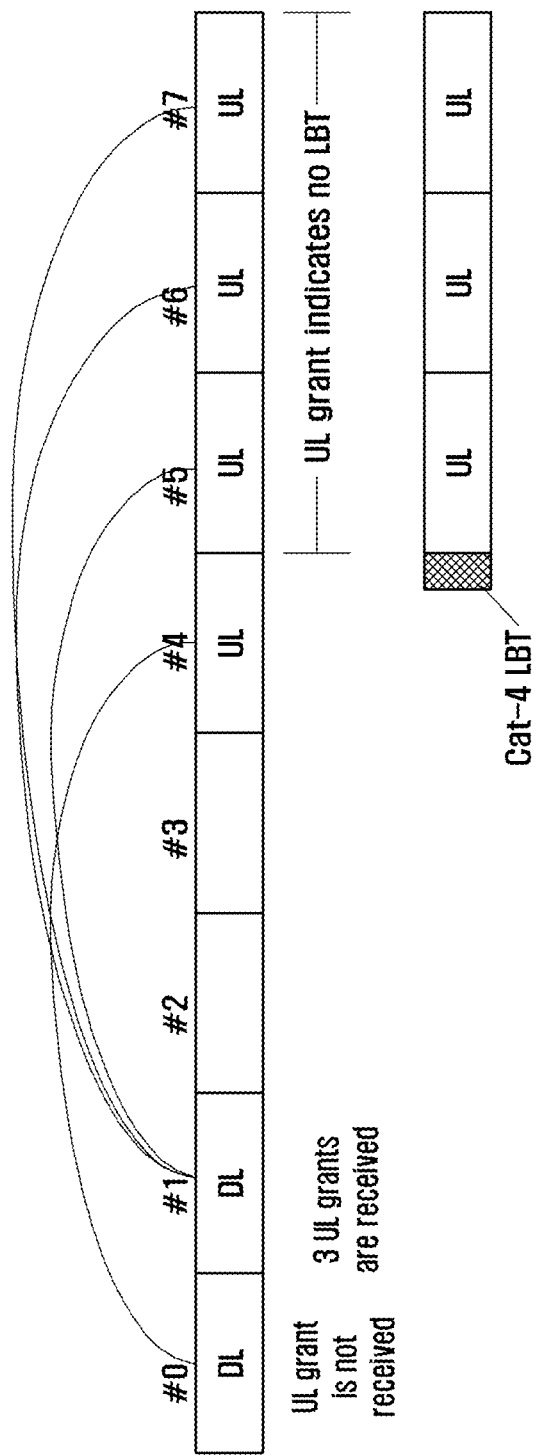
FIG. 3 is a schematic diagram showing how a UE determines an LBT type when UL grant contains an LBT indication and the UE has not received a UL grant of a previous subframe.

If the system does not support the first uplink subframe of a UL burst to start with no LBT, then when the UE receives a UL grant which indicates an LBT type being No LBT, the UE can determine that the base station scheduled uplink transmission in a previous subframe of the current subframe but the UE missed a corresponding UL grant. In this case, the UE performs LBT according to Cat-4. Since the UL grant indicates the LBT priority and the CWS adjustment related information, the UE can determine the Cat-4 LBT parameters based on this information. As shown in FIG. 3, the base station transmits a UL grant for scheduling uplink subframe #4 in downlink subframe #0, indicating that the LBT type is Cat-4, and transmits a UL grant for scheduling uplink subframes #5 to #7 in downlink subframe #1, indicating that the LBT type is No LBT. Subframes #4 to #7 are consecutive, and there is not a symbol of a gap. If the UE detects the UL grant for scheduling subframes #5 to #7, but does not detect the UL grant for scheduling subframe #5, then the UE performs Cat-LBT in subframe #5.

Mode 2: If the LBT type indicated by the UL grant of the current subframe is No LBT, and the system supports the first subframe of a UL burst to start with no LBT, then the UE determines that a previous subframe of the current subframe is a downlink subframe, and the UE does not need to perform LBT, and determines the PUSCH starting position according to a starting position indicated by the current subframe; if the UE cannot determine whether the previous subframe is a downlink subframe, then the UE determines the LBT type of the current subframe is a predefined default LBT type, e.g., Cat-4 LBT, and determines Cat-4 parameters according to the LBT priority and CWS adjustment related information of the current subframe. The PUSCH starting position is determined according to the starting position indicated by the current subframe.

Figure 4:
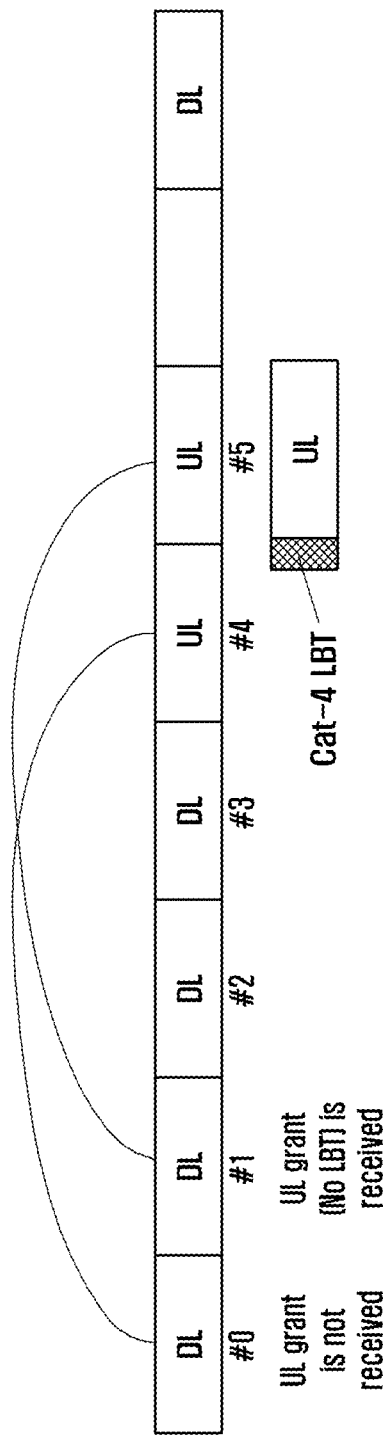
FIG. 4 is another schematic diagram showing how a UE determines an LBT type when UL grant contains an LBT indication and the UE has not received a UL grant of a previous subframe.
Figure 5:
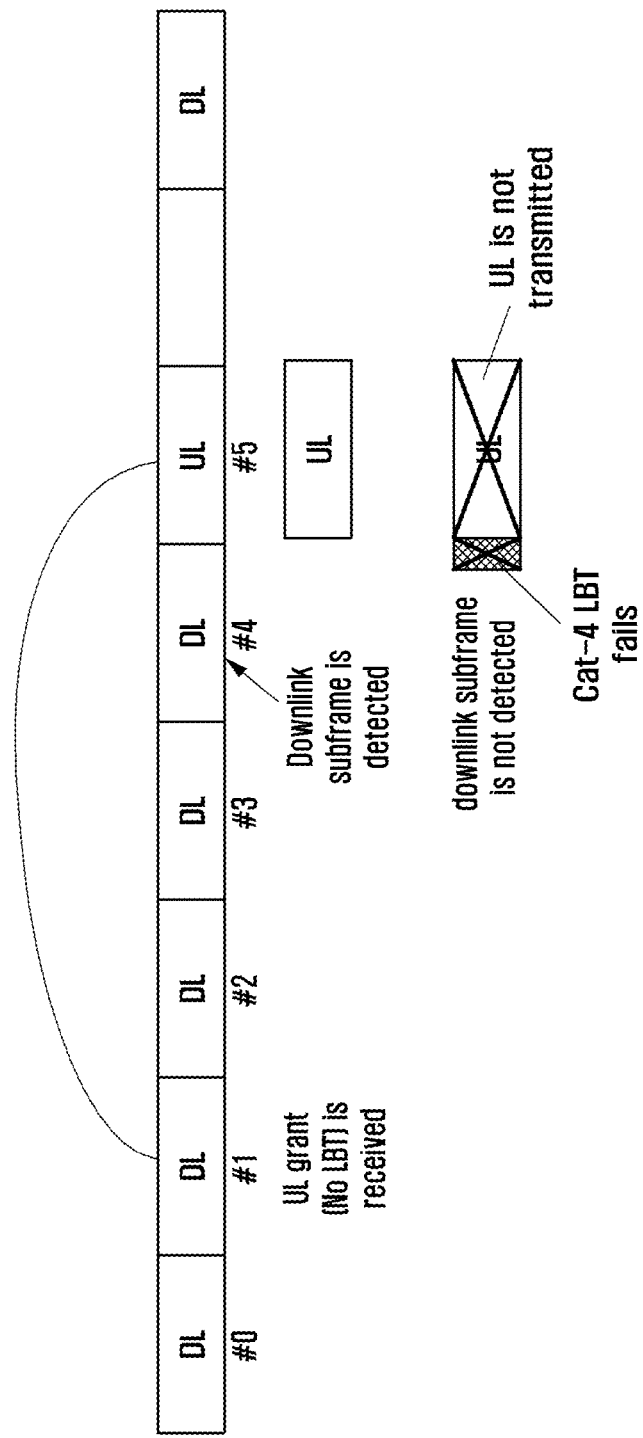
FIG. 5 is yet another schematic diagram showing how a UE determines an LBT type when UL grant contains an LBT indication and the UE has not received a UL grant of a previous subframe.

If the system supports the first uplink subframe of a UL burst starts with no LBT, for example, if a time interval between an uplink subframe and a downlink subframe is no longer than 16 µs, then the UE may not perform an LBT detection before a corresponding uplink subframe starts, but directly transmits the uplink subframe, then when the UE receives an indication of no LBT in the UL grant of the current subframe received, and has not detected the UL grant of the previous subframe, the UE may not be able to determine (a) whether the previous subframe is a downlink subframe and the current subframe is the first uplink subframe of the UL burst, and LBT does not need to be performed, or (b) the UE misses the UL grant of the previous uplink subframe. Therefore, if the UE can determine that the previous subframe is a downlink subframe, then the UE does not need to perform LBT, but transmits uplink transmission scheduled in the current subframe. Preferably, the UE may detect the previous subframe is a downlink subframe by detecting C-PDCCH signaling indicating that the previous subframe is a downlink subframe, and/or detecting signaling (PDCCH) in the previous subframe which schedules the UE to perform downlink transmission in the previous subframe, and/or determining the previous subframe is a downlink subframe by a CRS detection, and/or determine the previous subframe is a downlink subframe by an indication indicating the PUSCH starting position of the current subframe is timing advance+16 µs or 16 µs. If the UE is unable to determine that the previous subframe is a downlink subframe, then the LBT type of the current subframe is a predefined default LBT type, e.g., Cat-4 LBT. Because the UL grant indicates the LBT priority and CWS adjustment related information, the UE may determine Cat-4 LBT parameters according to these kinds of information. As shown in FIG. 4, the base station sends UL grants for scheduling uplink subframes #4 and #5 in downlink subframes #0 and #1 respectively. The UE detects the UL grant for scheduling subframe #5, but does not detect the UL grant for scheduling subframe #4. Since the UE has not detected a PDCCH in subframe #4, the UE is unable to determine whether subframe #4 is a downlink subframe, or determine subframe #4 is not a downlink subframe, then the UE perform Cat-4 LBT before subframe #5. As shown in FIG. 5, the base station transmits the UL grant for scheduling uplink subframe #5 in downlink subframe #1, and the UE detects the UL grant. Subframe #4 is a downlink subframe, and the base station transmits a C-PDCCH in subframe #4. If the UE detects that subframe #4 is a downlink subframe, for example, the UE detecting a C-PDCCH, the UE determines that subframe #4 is a downlink subframe, then the UE will not perform LBT, but transmit a PUSCH of subframe #5. If the UE has not detected that subframe #4 is a downlink subframe, e.g., the UE missing the C-PDCCH or CRS detection being inaccurate, then the UE performs Cat-4 LBT in subframe #5. Since the base station performs downlink transmission in subframe #4, the UE cannot pass the LBT detection, and therefore, the UE is unable to send a PUSCH of subframe #5.

If an LBT type that can be indicated by a UL grant includes No LBT, and the LBT type indicated by the UL grant of the current subframe is not No LBT, then the LBT type of the current subframe is an LBT type indicated by the UL grant scheduling the current subframe.

This case shows that the base station expects the UE to perform LBT. For example, the base station schedules UE1 to transmit a PUSCH in the previous subframe and the current subframe, and schedules UE2 to transmit a PUSCH from the current subframe. Therefore, in order to enable the newly scheduled UE2 to pass the CCA detection, a gap should be preserved in the current subframe, so that the newly scheduled UE2 and the previously scheduled UE1 can perform the CCA detection at the same time. In this case, there is a gap between the previous subframe and the current subframe.

If an LBT type that can be indicated by a UL grant does not include No LBT, for example, a UL grant only using 1 bit to indicate 25 µs LBT or Cat-4 LBT, then the UE determines that the LBT type of the current subframe is the LBT type indicated by the UL grant, and the starting position of the PUSCH is determined according to a starting position indicated by the UL grant of the current subframe.

In this case, it can be assumed that the base station does not support a UL burst starting with no LBT, but the base station still supports that LBT will not be performed between consecutive uplink subframes. The base station indicates this not by an explicit indication, no LBT, but indirectly by indicating there is no gap between adjacent subframes. For detailed description, please refer to (1.3) and (1.4).

In this case, no matter whether the UE has missed the UL grant of the previous subframe, the UE can perform LBT based on the LBT type indicated by the UL grant for scheduling the current subframe, as long as the UE has not detected the UL grant of the previous subframe.

(1.2) If the UE has not received the UL grant of the previous subframe, and has received the C-PDCCH that contains LBT indication information, then the UE may determine the LBT type and the PUSCH starting position of the current subframe according to at least one of the following three modes:

Mode 1: The UE determines the LBT type of the current subframe (which may contain No LBT) according to the LBT type indicated by the C-PDCCH, and that the PUSCH starting position of the current subframe is the PUSCH starting position of the UL grant that schedules the current subframe.

Mode 2: The UE determines the LBT type of the current subframe according to the LBT type indicated in the C-PDCCH and determines the PUSCH starting position of the current subframe according to the PUSCH starting position of the UL grant that schedules the current subframe. If LBT types of subsequent subframes need to be changed, see Embodiment 2.

(1.3) If the UL grant of the previous subframe is received and the C-PDCCH containing LBT indication information is not received, then:

If an LBT type that can be indicated by a UL grant includes No LBT, and the LBT type indicated by the UL grant of the current subframe is No LBT (in a more reasonable case, from the UL grant of the current subframe and the UL grant of the previous subframe it can be determined that there is no gap between the previous subframe and the current subframe), then: if the UE successfully transmits the PUSCH of the previous subframe, the UE does not need to perform LBT (LBT type is LBT), and the PUSCH starting position is the starting position indicated by the UL grant (i.e., symbol #0); and if the UE does not successfully transmit the PUSCH of the previous subframe, the LBT type is a default LBT type, such as Cat-4 LBT, and the UE needs to determine Cat-4 parameters according to the LBT priority and CWS adjustment related information of the current subframe.

Since the UE has successfully received the UL grant of the previous subframe, the UE may determine that the previous subframe must be an uplink subframe, not a downlink subframe. Therefore, there is no problem that the UE cannot determine whether the previous subframe is an uplink subframe or a downlink subframe.

Figure 7:
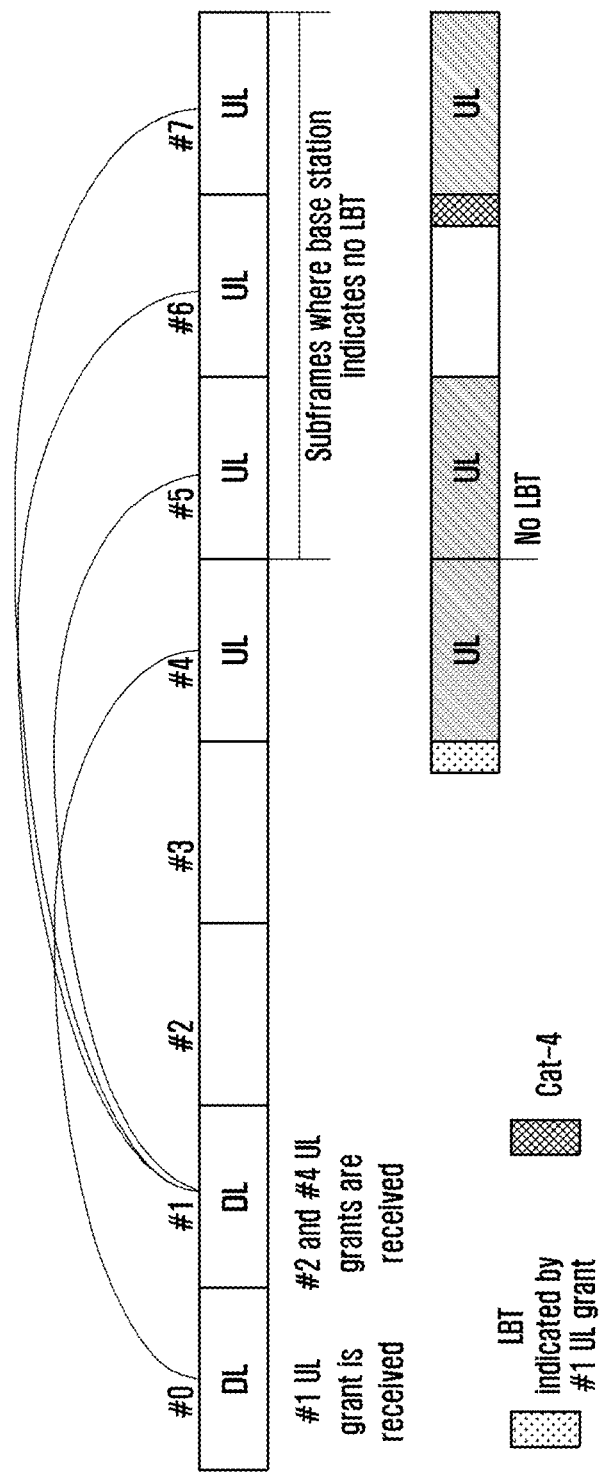
FIG. 7 is a schematic diagram showing how a UE determines an LBT type when a UL grant contains an LBT indication and the UE has received a UL grant of a previous subframe.

As shown in FIG. 7, the base station transmits a UL grant for scheduling uplink subframe #4 in subframe #0, where an indicated LBT type is Cat-4 LBT. The base station transmits UL grants for scheduling uplink subframes #5, #6, and #7 in subframe #1, where an LBT type indicated is No LBT. The base station indicates that the four subframes are consecutive and there is no gap. That is, the base station expects to schedule the UE to continuously transmit PUSCHs in subframes #4 to #7. The UE detects the UL grant for scheduling subframe #4 in subframe #0, and detects the UL grants for scheduling subframes #5 and #7 in subframe #1. Then, the UE may determine that subframes #4 to #5 are consecutive. Therefore, the UE performs LBT according to Cat-4 indicated by the UL grant before subframe #4, and if LBT is passed, the UE may transmit PUSCHs continuously in the subframes #4 and #5, that is, LBT does not need to be performed for subframe #5. The UE performs LBT according to Cat-4 before subframe #7, the Cat-4 parameters may be determined by the LBT priority and CWS adjustment related information in the UL grant. If LBT before subframe #4 is unsuccessful, the UE performs LBT according to Cat-4 before subframe #5, and the Cat-4 parameters may be determined according to LBT priority and CWS adjustment related information in the UL grant.

If an LBT type that can be indicated by a UL grant includes No LBT, and the LBT type indicated by the UL grant of the current subframe is not No LBT, the UE determines the LBT type in the current subframe according to LBT indicated by the UL grant, and the PUSCH starting position is determined according to a starting position indicated by the UL grant of the current subframe.

This case shows that the base station expects the UE to perform LBT. For example, the base station schedules UE1 to transmit a PUSCH in the previous subframe and the current subframe, and schedules UE2 to transmit a PUSCH from the current subframe. Therefore, in order to enable the newly scheduled UE2 to pass the CCA detection, a gap should be preserved in the current subframe, so that the newly scheduled UE2 and the previously scheduled UE1 can perform the CCA detection at the same time. In this case, there is a gap between the previous subframe and the current subframe.

If an LBT type that can be indicated by a UL grant does not include No LBT, for example, a UL grant only using 1 bit to indicate 25 µs LBT or Cat 4 LBT, then: If the UE can determine that there is no gap between the previous subframe and the current subframe according to indications by the UL grant of the previous subframe and the UL grant of the current subframe, and if the UE successfully transmits the PUSCH of the previous subframe, then the UE does not need to perform LBT (LBT type is No LBT), and the PUSCH starting position is the starting position indicated by the UL grant (i.e., #0 symbol); If the UE has not successfully transmitted the uplink signal of the previous subframe or the UE can determine that there is a gap between the previous subframe and the current subframe according to the UL grant of the current subframe and the UL grant of the previous subframe, then the UE needs to determine the LBT type according to the LBT type indicated by the UL grant, determine the LBT parameters according to the LBT priority and CWS adjustment related information, and determine the PUSCH starting position according to the UL grant.

In order to save the overhead of the LBT type indication, one implementation is that the LBT type indicated by the UL grant does not contain No LBT. But this means that when the base station continuously schedules uplink subframes, the UE still has to perform LBT within consecutive uplink subframes. The UE needs to determine whether it needs to perform LBT according to whether there is a gap between the current subframe and the previous subframe.

For example, if uplink transmission scheduled by the previous subframe occupies the last SC-FDMA symbol and uplink transmission scheduled by the current subframe starts from the first SC-FDMA symbol (#0 symbol), then the UE can determine that the two subframes are continuous, and there is no gap. Therefore, if in the previous subframe, the UE has performed transmission, then the UE may not perform LBT in the current subframe, but perform transmission directly. As another example, if uplink transmission scheduled by the previous subframe occupies the last SC-FDMA symbol, and uplink transmission scheduled by the current subframe starts from the second SC-FDMA symbol (#1 symbol), then the UE can determine that the two subframes are inconsecutive, and that there is a gap between them. Therefore, the UE performs LBT according to LBT information indicated by the UL grant before the current subframe is transmitted. If LBT is passed, the UE can transmit the scheduled uplink signal in the current subframe.

Figure 8:
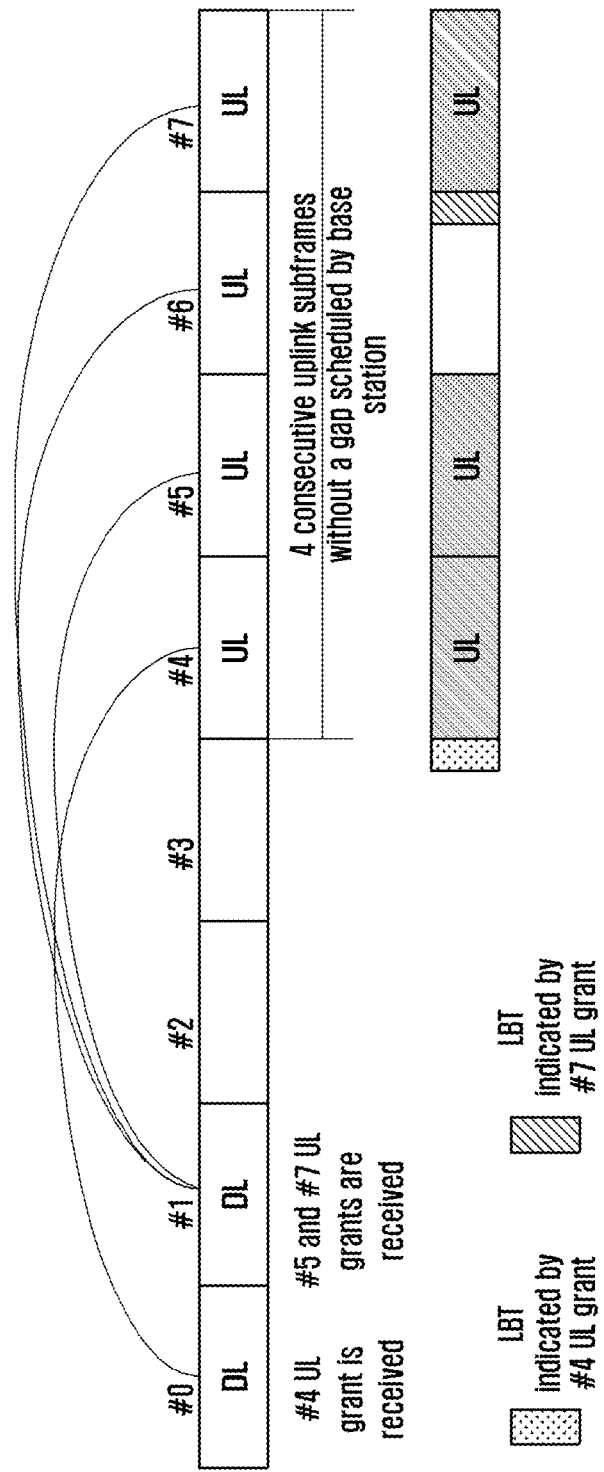
FIG. 8 is another schematic diagram showing how a UE determines an LBT type when a UL grant contains an LBT indication and the UE has received a UL grant of a previous subframe.

As shown in FIG. 8, the base station transmits the UL grant for scheduling uplink subframe #4 in subframe #0, where the indicated LBT type is Cat-4 LBT. The base station sends the UL grants for scheduling uplink subframes #5, #6, and #7 in subframe #1, where the indicated LBT types are Cat-4 LBT. The base station indicates that the four subframes are consecutive and there is no gap between them. That is, the base station expects to schedule the UE to continuously transmit the PUSCH in subframes #4 to #7. The UE detects the UL grant for scheduling subframe #4 in subframe #0, and detects the UL grants for scheduling subframes #5 and #7 in subframe #1. Then, the UE can determine that subframes #4 to #5 are consecutive. Therefore, the UE performs LBT before subframe #4 according to Cat-4 indicated by the UL grant, and if LBT is passed, then the UE may continuously transmit the PUSCH in subframe #4 and subframe #5. That is, LBT does not need to be performed for subframe #5, though the UL grant for scheduling subframe #5 indicates the LBT type. The UE performs LBT according to Cat-4 indicated by the UL grant before subframe #7. If LBT before subframe #4 is unsuccessful, the UE performs LBT according to LBT indicated by the UL grant for scheduling subframe #5 before subframe #5.

(1.4) If the UL grant of the previous subframe is received and a C-PDCCH containing LBT indication information is received, then:

If an LBT type that can be indicated by a UL grant includes No LBT, and the LBT type indicated by the UL grant of the current subframe is No LBT, and if the current subframe and the previous subframe belong to subframe sets of the same LBT type, then if the UE successfully transmits the PUSCH of the previous subframe, then the UE does not need to perform LBT (the LBT type is No LBT) and determines the PUSCH starting position according to the UL grant; and if the UE does not successfully transmit the PUSCH of the previous subframe, then the UE may determine the LBT type of the current subframe according to one of the following modes:

Mode 1: the LBT type of the current subframe is the LBT type indicated by the C-PDCCH.

Mode 2: the LBT type of the current subframe is the LBT type indicated by the UL grant of the previous subframe.

Mode 3: the LBT type of the current subframe is a default subframe type, such as Cat-4 LBT.

Mode 4: the UE needs to further determine whether there is an adjacent uplink subframe without a gap after the current subframe is scheduled, see embodiment II.

Figure 9:
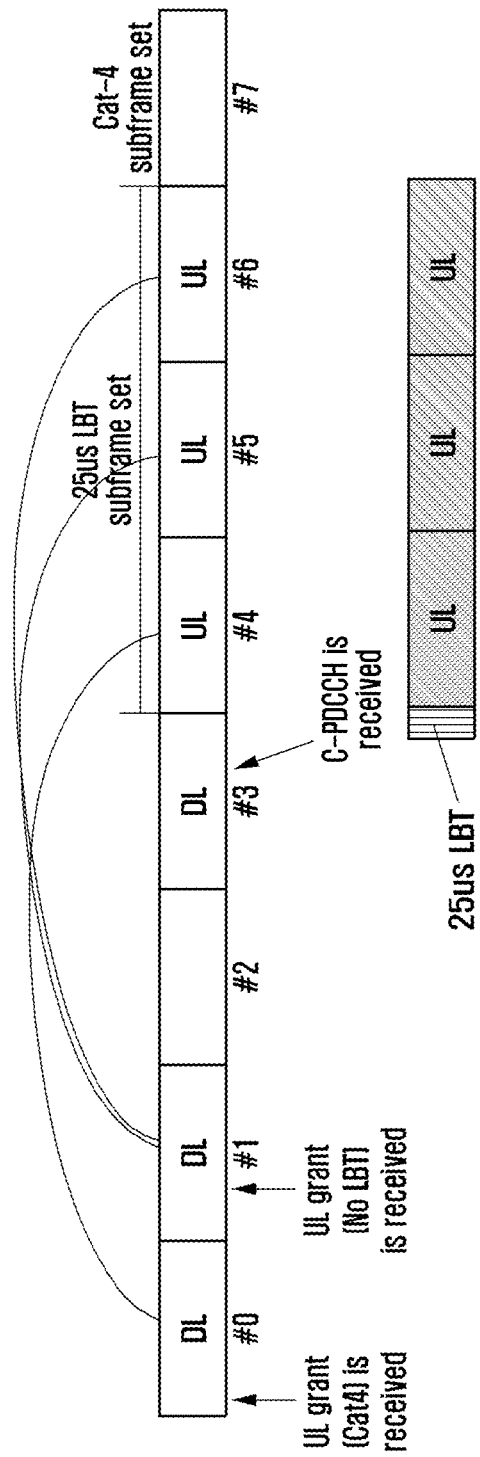
FIG. 9 is yet another schematic diagram showing how a UE determines an LBT type when a UL grant contains an LBT indication and the UE has received a UL grant of a previous subframe.

As shown in FIG. 9, the base station transmits the UL grant for scheduling uplink subframe #4 in subframe #0, where the indicated LBT type is Cat-4 LBT. The base station transmits the UL grants for scheduling uplink subframes #5 and #6 in subframe #1, where the indicated LBT type is No LBT. That is, the base station expects to schedule the UE to continuously transmit the PUSCH in subframes #4 to #6. The UE detects the UL grant in subframe #0, detects the UL grants for scheduling subframe #5 and subframe #6 in subframe #1 (there is no gap between the two subframes), and detects the C-PDCCH in downlink subframe #3, where subframes #4 to #6 fall within a 25 μs LBT subframe set, and subframe #7 falls within a Cat-4 LBT subframe set. Then, the UE can determine that subframes #4 to #6 belong to the same LBT subframe set. The UE performs 25 μs LBT before subframe #4, and if LBT is passed, the UE starts to transmit PUSCHs from subframe #4, until subframe #6. The PUSCHs of the three subframes are consecutive and no LBT is required in the middle of the subframes.

If an LBT type that can be indicated by a UL grant includes No LBT, and the LBT type indicated by the UL grant of the current subframe is No LBT, and if the current subframe and the previous subframe do not belong to subframe sets of the same LBT type, the UE may determine the LBT type of the current subframe by one of the following two modes:

Mode 1: The UE does not change an LBT type of an uplink subframe adjacent to the current subframe (there is no gap between the current subframe and the adjacent uplink subframe) according to LBT information indicated by the C-PDCCH. If the UE has transmitted an uplink signal in a previous subframe of the current subframe, the UE does not need to perform LBT in the current subframe, and the UE transmits a PUSCH in the current subframe according to a PUSCH starting position indicated; and if the UE has not successfully transmitted a PUSCH in the previous subframe, then the LBT type of the current subframe is the LBT type indicated by the C-PDCCH, or the UE needs to further determine whether an adjacent uplink subframe without a gap is scheduled after the current subframe, and if there is such a subframe, and that the subsequent subframe and the current subframe belong to subframe sets of different LBT types, then the LBT type of the current subframe is a default LBT type, e.g., Cat-4 LBT, and if there is such a subframe, and that the subsequent subframe and the current subframe belong to subframe sets of the same LBT type, then the LBT type of the current subframe is an LBT type indicated by the C-PDCCH. A PUSCH is transmitted in the current subframe according to a PUSCH starting position indicated.

Figure 10:
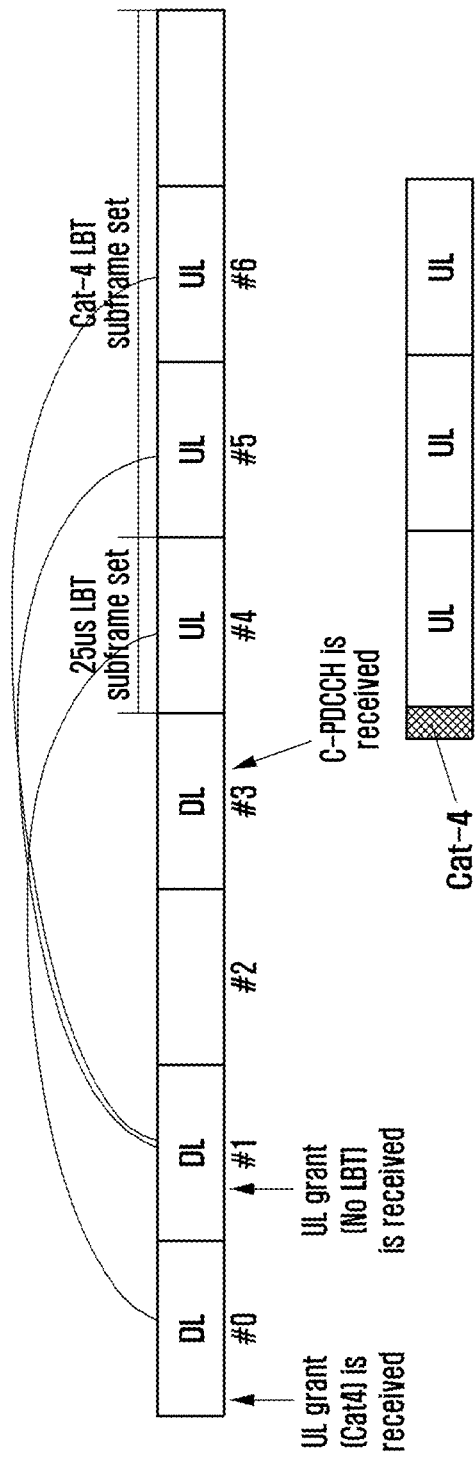
FIG. 10 is still another schematic diagram showing how a UE determines an LBT type when a UL grant contains an LBT indication and the UE has received a UL grant of a previous subframe.

As shown in FIG. 10, the base station transmits a UL grant for scheduling uplink subframe #4 in subframe #0, where the indicated LBT type is Cat-4 LBT. The base station transmits a UL grant for scheduling uplink subframes #5 and #6 in subframe #1, where the indicated LBT type is No LBT. That is, the base station expects to schedule the UE to continuously transmit PUSCHs in subframes #4 to #6. The UE detects the UL grant in subframe #0, and detects the UL grant for scheduling subframe #5 and subframe #6 in subframe #1 (there is no gap between the three subframes), and the UE detects a C-PDCCH in downlink subframe #3, and the C-PDCCH indicates that subframes #4 to #5 fall within a 25 μs LBT subframe set, and that subframe #6 falls within a Cat-4 LBT subframe set. Then the UE does not perform LBT according to 25 μs LBT before subframe #4, but according to Cat-4 indicated in the UL grant. If LBT is passed, then the UE starts to transmit PUSCHs from subframe #4, until subframe #6. The PUSCHs of the three subframes are consecutive, and no LBT is needed between them. In the present example, the current subframe is subframe #5, and subframe 4 of the current subframe does not change the LBT type according to the C-PDCCH.

Mode 2: The LBT type of the current subframe is the LBT type indicated by the C-PDCCH, and
a PUSCH starting position is #0 symbol.
a PUSCH starting position is #1 symbol (Cat-4 LBT). Rate matching is still performed for the PUSCH based on the PUSCH starting position being #0 symbol, and #0 symbol is punctured off.

a PUSCH starting position is #0 symbol+25 μs (Cat-2 LBT). Rate matching is still performed for the PUSCH based on the PUSCH starting position being #0 symbol, and then 25 μs is punctured off.

If an LBT type that can be indicated by a UL grant includes No LBT, and an LBT type indicated by the UL grant of the current subframe is not No LBT.

In this case, the base station expects the UE to perform LBT, and there is a gap between the current subframe and the previous subframe. The LBT type of the current subframe is an LBT type indicated by the C-PDCCH, and the PUSCH starting position is determined according to a starting position indicated by the UL grant of the current subframe, or the UE needs to further determine whether an adjacent uplink subframe without a gap after the current subframe is scheduled, and if there is such a subframe, and the subsequent subframe and the current subframe belong to subframe sets having different LBT types, then the LBT type of the current subframe is the LBT type indicated by the UL grant; and if there is such a subframe and the subsequent subframe and the current subframe belong to subframe sets of the same LBT type, then the LBT type of the current subframe is the LBT type indicated by the C-PDCCH. The PUSCH starting position is determined according to the starting position indicated by the UL grant of the current subframe.

If an LBT type that can be indicated by a UL grant does not include No LBT, for example, only 1 bit indicating 25 μs LBT or Cat 4 LBT, then: if the UE can determine that there is no gap between the current subframe and the previous subframe according to indications by the UL grant of the current subframe and the UL grant of the previous subframe, and if the UE transmits a PUSCH of the previous subframe successfully, then the UE does not need to perform LBT, and a PUSCH starting position of the previous subframe is a starting position indicated by the UL grant (#0 symbol); and if the UE has not transmitted a PUSCH of the previous subframe successfully, then if the UE can determine that there is a gap between the previous subframe and the current subframe according to the indications by the UL grant of the current subframe and the UL grant of the previous subframe, then the LBT type of the current subframe is an LBT type indicated by the C-PDCCH, or similarly to the mode mentioned above, whether the LBT type indicated by the UL grant or the LBT type indicated by the C-PDCCH is performed is determined according to whether there is a consecutive uplink subframe subsequent to the current subframe and whether the current subframe and the subsequent uplink subframe belong to subframe sets of the same LBT type.

(2) If only the C-PDCCH contains the LBT indication, the UE may, based on LBT information indicated by the C-PDCCH and whether a UL grant of the previous subframe is received and whether there is a gap between the previous subframe and the current subframe, determine the LBT type and/or the PUSCH starting position of the current subframe.

(1.1) If the UL grant of the previous subframe is not received, the PUSCH starting position of the current subframe is determined based on the starting position indicated by the UL grant of the current subframe, and the LBT type of the current subframe may be determined by one of the following three modes:

Mode 1: The LBT type of the current subframe is the LBT type indicated by the newly received C-PDCCH, Mode 2: Similar to the above described mode, it is further determined whether the LBT type indicated by the previous C-PDCCH or the LBT type indicated by the newly received C-PDCCH is performed by determining whether there is a consecutive uplink subframe subsequent to the current subframe, and whether the current subframe and the subsequent subframe belong to subframe sets of the same LBT type, as shown in Embodiment II (2).

Mode 3: Similar to the above described mode, the LBT type of the current subframe is determined according to the LBT type indicated by the C-PDCCH newly received, and if LBT is successful, then scheduled uplink subframes without a gap can be continuously transmitted, until a subframe set of another LBT type starts, then the subframe set of another LBT type is transmitted according to another LBT type, as shown in Embodiment II (2).

Figure 12:
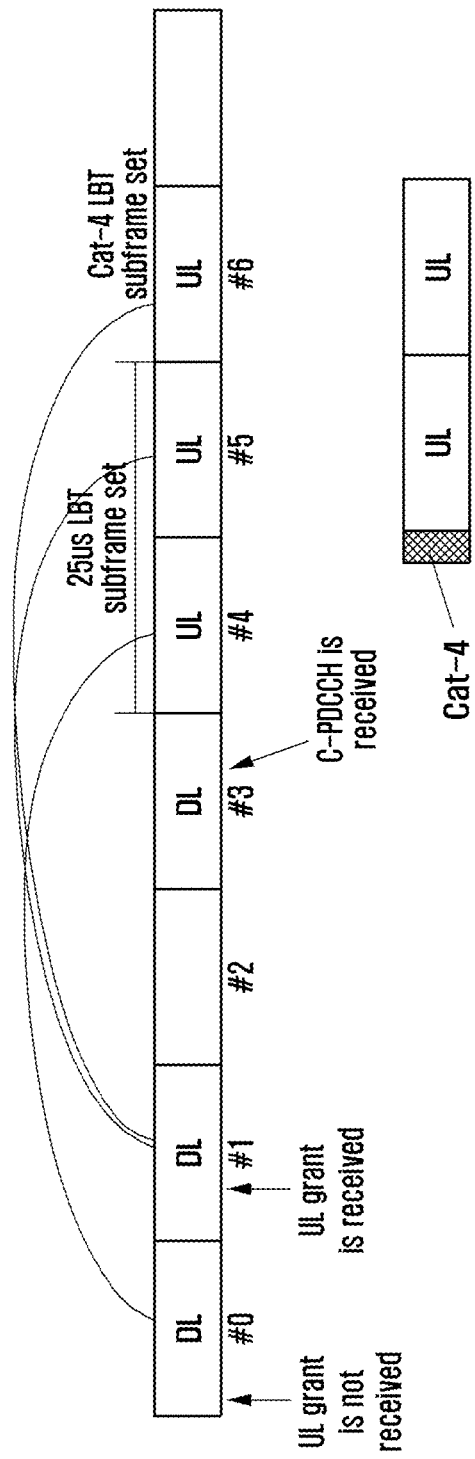
FIG. 12 is a schematic diagram showing how a UE determines an LBT type when only a C-PDCCH contains an LBT indication.

As shown in FIG. 12, the base station transmits a UL grant for scheduling uplink subframe #4 in subframe #0. The base station transmits UL grants for scheduling uplink subframes #5 and #6 in subframe #1. There is no gap between the three subframes, and the base station expects to schedule the UE to continuously transmit PUSCHs in subframes #4 to #6. Subframe #4 to subframe #6 belong to the Cat-4 LBT subframe set according to LBT indicated by the previous C-PDCCH. But the base station sends a new C-PDCCH in subframe #3, indicating that subframe #4 to subframe #5 belong to the 25 μs LBT subframe set and subframe #6 belongs to the Cat 4 subframe set. The UE does not detect a UL grant in subframe #0, detects UL grants for scheduling subframe #5 and subframe #6 in subframe #1 (there is no gap between these two subframes), and detects a new C-PDCCH in downlink subframe #3. Then, the UE does not perform LBT according to Cat-4 indicated by the previous C-PDCCH without following 25 μs LBT indicated by the newly received C-PDCCH before subframe #5. If LBT is passed, the UE starts to transmit PUSCH from subframe #5 until subframe #6. The PUSCHs of the two subframes are consecutive and no LBT is required in the middle of the two subframes. In this example, the current subframe is subframe #5.

Figure 13:
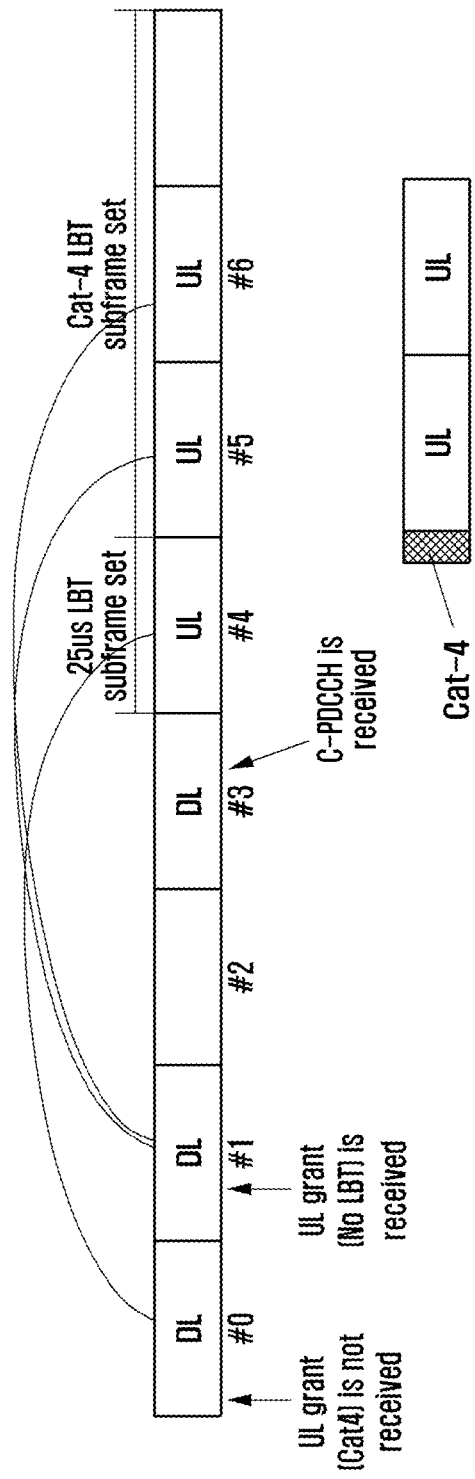
FIG. 13 is another schematic diagram showing how a UE determines an LBT type when only a C-PDCCH contains an LBT indication.

As shown in FIG. 13, the base station transmits a UL grant for scheduling subframe #4 in subframe #0. The base station transmits UL grants for scheduling uplink subframes #5 and #6 in subframe #1. There is no gap between the three subframes, and the base station expects to schedule the UE to continuously transmit PUSCHs in subframes #4 to #6. Subframe #4 to subframe #6 belong to the Cat-4 LBT subframe set according to LBT indicated by the previous C-PDCCH. However, the base station transmits a new C-PDCCH in subframe #3, indicating that subframe #4 belongs to the 25 μs LBT subframe set and subframes #5 to #6 belong to the Cat-4 LBT subframe set. The UE has not detected a UL grant in subframe #0, detects UL grants for scheduling subframe #5 and subframe #6 in subframe #1 (there is no gap between these two subframes), and detects a new C-PDCCH in downlink subframe #3. Then, the UE performs LBT in subframe #5 according to Cat-4 LBT indicated by the newly received C-PDCCH. If LBT is passed, the UE starts to transmit PUSCHs from subframe #5 until subframe #6. The PUSCHs of the two subframes are consecutive and no LBT is required in the middle of the two subframes. In this example, the current subframe is subframe #5.

(1.2) If the UE receives the UL grant of the previous subframe, and determines that there is a gap between the previous subframe and the current subframe according to the UL grants of the previous subframe and the current subframe, then the UE determines the LBT type and the PUSCH starting position of the current subframe by (2.1).

(1.3) If the UE receives the UL grant of the previous subframe, and the UE determines that there is no gap between the previous subframe and the current subframe according to the UL grants of the previous subframe and the current subframe:

If the current subframe and the previous subframe belong to subframe sets of the same LBT type, if the UE has successfully transmitted the PUSCH of the previous subframe, the UE will not perform LBT, and the PUSCH starting position is #0 symbol. If the UE has not transmitted the PUSCH of the previous subframe successfully, then the UE determines the LBT type and the PUSCH starting position of the current subframe according to (2.1).

Figure 14:
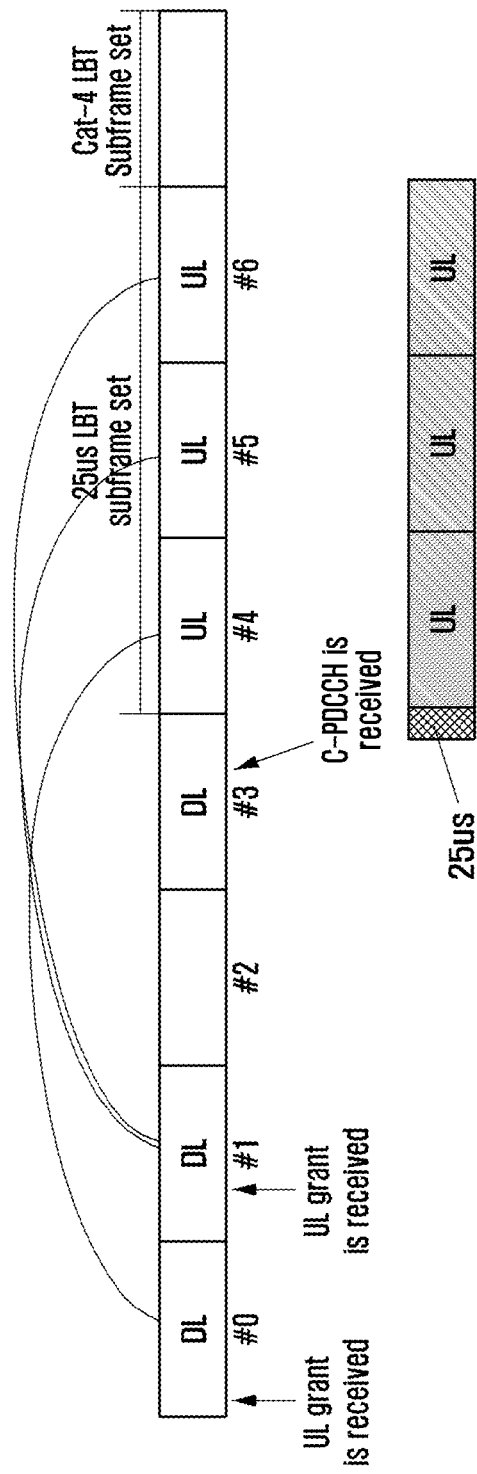
FIG. 14 is yet another schematic diagram showing how a UE determines an LBT type when only a C-PDCCH contains an LBT indication.

As shown in FIG. 14, the base station transmits a UL grant for scheduling uplink subframe #4 in subframe #0. The base station transmits UL grants for scheduling uplink subframes #5 and #6 in subframe #1. There is no gap between the three subframes, and the base station expects to schedule the UE to continuously transmit PUSCHs in subframes #4 to #6. Subframe #4 to subframe #6 belong to the Cat-4 LBT subframe set according to LBT indicated by the previous C-PDCCH. But the base station transmits a new C-PDCCH in subframe #3, indicating that subframes #4 to #6 belong to the 25 μs LBT subframe set and subframe #7 belongs to the Cat-4 LBT subframe set. The UE detects a UL grant in subframe #0, detects UL grants for scheduling subframe #5 and subframe #6 in subframe #1 (there is no gap between the two subframes), and detects a new C-PDCCH in downlink subframe #3. Then, the UE performs LBT before subframe #4 according to 25 μs LBT indicated by the C-PDCCH newly received. If LBT is passed, then the UE starts to transmit PUSCHs from subframe #4 until subframe #6. The three subframes are consecutive, no LBT is required in the middle of the subframes. If LBT is not passed in subframe #4, then 25 μs LBT is performed in subframe #5, and if LBT is passed, then PUSCHs are transmitted starting from subframe #5, until subframe #6. In the present example, the current subframe is subframe #5.

If the current subframe and the previous subframe belong to subframe sets of different LBT types, then the LBT type and the PUSCH starting position of the current subframe may be determined in one of three modes:

Mode 1: The UE does not change the LBT type of the uplink subframe adjacent to the current subframe (there is no gap between them) according to LBT information indicated by the newly received C-PDCCH, if the UE transmits an uplink signal in the previous subframe of the current subframe, the UE does not need to perform LBT in the current subframe, and the starting position of the current subframe is the PUSCH starting position indicated by the UL grant; and if the UE has not successfully transmitted the PUSCH of the previous subframe, then the LBT type of the current subframe is the LBT type indicated by the C-PDCCH, and the PUSCH starting position indicated by the UL grant is the starting position of the current subframe.

Mode 2: The UE needs to further determine whether there is an adjacent uplink subframe without a gap subsequent to the current subframe is scheduled, and if there is such a subframe and the subsequent subframe and the current subframe belong to subframe sets of different LBT types, then the LBT type of the current subframe is the LBT type indicated by the C-PDCCH previously received, and if there is such as subframe, and the subsequent subframe and the current subframe belong to subframe sets of the same LBT type indicated by the C-PDCCH newly received, then the LBT type of the current subframe is the LBT type indicated by the newly received C-PDCCH. The PUSCH starting position indicated by the UL grant is the starting position of the current subframe.

Mode 3: No matter whether the UE has transmitted the PUSCH of the previous subframe successfully, the LBT type of the current subframe is the LBT type indicated by the C-PDCCH newly received, PUSCH starting position is #0 symbol.

PUSCH starting position is #1 symbol (Cat-4 LBT). Rate matching is still performed for PUSCH according to PUSCH starting position is #0 symbol, and then #0 symbol is punctured off.

PUSCH starting position is #0 symbol+25 μs (Cat-2 LBT). Rate matching is still performed for PUSCH according to PUSCH starting position is #0 symbol, and then 25 μs is puctured off.

Step 203: LBT is performed for the current subframe according to the determined LBT type, and if LBT is passed, a PUSCH is transmitted in the current subframe from the PUSCH starting position determined; if LBT fails, a PUSCH is not transmitted in the current subframe.

In the present disclosure, the examples given are scenarios of single-subframe scheduling, but the present disclosure is also applicable to multi-subframe scheduling scenarios. For example, consecutive uplink subframes may also be indicated by one or more UL grants of multi-subframe scheduling. For example, the base station expects to continuously schedule subframe #0 to subframe #5, but the maximum length of multi-subframe scheduling is 4 subframes, the base station may transmit two UL grants, one of which is used to schedule subframe #0 to subframe #3 and the other is used to schedule subframe #4 to subframe #5. The five subframes are consecutive and there is no gap inside.

Embodiment 2

Figure 15:
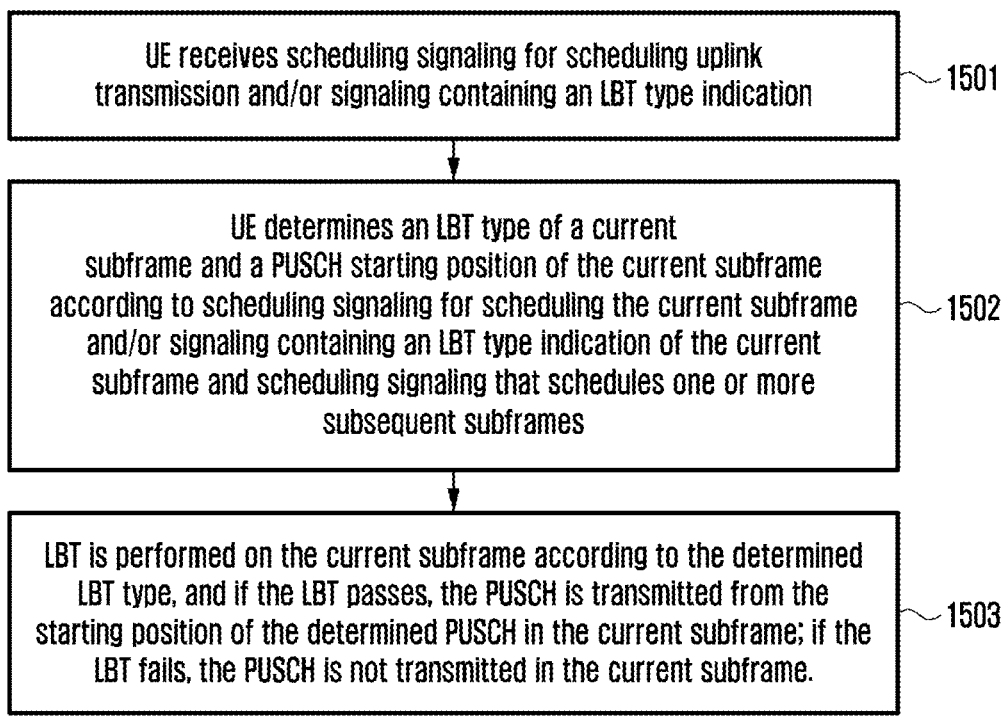
FIG. 15 is a flowchart of a method for transmitting uplink signals according to Embodiment 2 of the present disclosure.

FIG. 15 is a flowchart of a method for transmitting uplink signals according to an embodiment of the present disclosure. The method includes the following procedures.

Step 1501: a UE receives scheduling signaling for scheduling uplink transmission and/or signaling containing an LBT type indication.

Preferably, scheduling signaling for scheduling uplink transmission may be a UL grant.

Preferably, scheduling signaling for scheduling uplink transmission may be a UL grant for single-subframe scheduling or a UL grant for multi-subframe scheduling.

Preferably, scheduling signaling for scheduling uplink transmission may contain an LBT type indication, e.g., 25 μs LBT or Cat 4 LBT, or no LBT.

Preferably, scheduling signaling for scheduling uplink transmission also contains information related to LBT, such as LBT priority, and/or information related to adjustment of contention window size. Information related to adjustment of contention window size may be explicit, e.g., the base station may explicitly indicates a size of a CW, or information related to adjustment of contention window size may be implicit, e.g., the base station may send information that directly or indirectly indicates ACK/NACK, so that the UE can determine the size of the CW based on this information. The present disclosure is not limited thereto. The UE can use this information to determine parameters of Cat-4 LBT. LBT-related information and LBT type indications in scheduling signaling may be separate bit indications, or may be coded in combination, which is not limited by the present disclosure.

Preferably, scheduling signaling for scheduling uplink transmission may be physical layer signaling, such as a UL grant that contains the contents of an existing UL grant and LBT-related information and/or transmission time information of an uplink signal. scheduling signaling for scheduling uplink transmission may be two physical layer signalings. For example, in the first step, it is a UL grant that contains the contents of the existing UL grant and/or transmission time information of an uplink signal and/or LBT-related information, and in the second step, it is a UL grant or user group scheduling/triggering signaling or cell common signaling.

Preferably, signaling containing the LBT type indication may be cell common signaling, such as a C-PDCCH. Cell common signaling indicates a specific LBT type, and the present disclosure is not limited thereto.

Preferably, whether the C-PDCCH indicates LBT information may be configured by a higher layer, or may be pre-defined by the system.

Step 1502: an LBT type of a current subframe and a PUSCH starting position of the current subframe are determined according to scheduling signaling for scheduling the current subframe and/or signaling containing an LBT type indication of the current subframe and scheduling signaling that schedules one or more subsequent subframes.

Preferably, the UL grant contains LBT type information, and the C-PDCCH does not contain LBT type information.

Preferably, the UL grant contains LBT type information, and the C-PDCCH contains LBT type information.

Preferably, the UL grant does not contain LBT type information, and the C-PDCCH contains LBT type information.

In this step, two situations where (1) the UL grant contains LBT type information, and the C-PDCCH contains or does not contain LBT type information; and (2) the UL grant does not contain LBT type information, and the C-PDCCH contains LBT type information will be described.

Preferably, the PUSCH starting position of the current subframe is determined based on the starting position indicated by the UL grant for scheduling the current subframe. If it is multi-subframe scheduling, if it is the first subframe of multiple scheduled subframes, then the starting position is a starting position indicated by the UL grant, and if it is not the first subframe of the multiple subframes, then the PUSCH starting position is the first symbol of the subframe, i.e., #0 symbol, or the PUSCH starting position is determined according to the starting position indicated by the UL grant, which cases are collectively referred to as the starting position indicated by the UL grant in the following description.

(1) If the UL grant contains the LBT indication, then the UE may determine the LBT type and/or the PUSCH starting position of the current subframe according to LBT information indicated by the UL grant, and/or LBT information indicated by the C-PDCCH, and whether the UE receives a UL grant/UL grants of subsequent one or more subframes, and whether there is a gap between the subsequent one or more continuously scheduled subframes and the current subframe.

(1.1) If the UL grant contains the LBT indication, and the UE receives the C-PDCCH contains LBT indication information, then the UE needs to determine whether there is an adjacent uplink subframe after the current subframe is scheduled (the UE detects corresponding scheduling signaling), and if there is such a subframe, and a subsequent subframe and the current subframe belong to subframe sets having different LBT types, then the LBT type of the current subframe may be determined according to any of the following modes, or otherwise, the LBT type of the current subframe may be determined according to the LBT indicated by the C-PDCCH.

Mode 1: The LBT type of the current subframe is determined according to the most conservative LBT type of these continuously scheduled subframes and the PUSCH starting position of the current subframe is the PUSCH starting position indicated by the UL grant.

An exception is that, if the current subframe is No LBT (a gap between the previous downlink subframe and the current uplink subframe is less than 16 μs) and the subsequent subframes are 25 μs, the LBT type of the current subframe is No LBT. For other circumstances, the most conservative LBT type is used. For example, if the current subframe is no LBT (a gap between the previous downlink subframe to the current uplink subframe is less than 16 μs), the first subsequent subframe is 25 μs LBT, and the second subsequent subframe is Cat-4 LBT, then the current subframe performs Cat-4 LBT. For example, if the current subframe is 25 μs LBT and the next two subframes are Cat-4 LBT, then the current subframe performs Cat-4 LBT.

Mode 2: the LBT type of the current subframe is determined according to an LBT type indicated by a UL grant scheduling the current subframe (if the indicated LBT type is not No LBT) and the PUSCH starting position of the current subframe is a PUSCH starting position indicated by the UL grant.

For mode 2, if the UL grant for scheduling the current subframe does not indicate an LBT type, for example, the base station expects to schedule multiple continuously scheduled subframes, but the current subframe is a subframe in the middle of the multiple continuously scheduled subframes, and the base station indicates No LBT, then a pre-defined default LBT type, such as Cat-4 LBT, may be performed.

Mode 3: The LBT type of the current subframe is determined according to an indication by a C-PDCCH, but an LBT type of a first subsequent subframe which does not fall within a subframe set having the same LBT type with the current subframe should be determined according to the indication by the C-PDCCH, and a starting position of the PUSCH is a predefined starting position, for example:

The PUSCH starting position is the #1 symbol (if the LBT type of this subframe is Cat-4 LBT). Rate matching is still performed for the PUSCH according to the PUSCH starting position being the #0 symbol, and then the #0 symbol is punctured off.

The PUSCH starting position is the #0 symbol+25 μs (if the LBT type of this subframe is Cat-2 LBT). Rate matching is still performed for the PUSCH according to the PUSCH starting position being the #0 symbol, and then 25 μs is punctured off.

Preferably, a subframe set belonging to the LBT type is determined by an indication of a C-PDCCH. For example, the base station transmits a C-PDCCH in subframe #n indicating that subframe #n+1 to subframe #n+k fall within a 25 μs LBT subframe set, and that subframe #n+k+1 and the subsequent subframes fall within a Cat-4 LBT subframe set. Note that subframes falling within the 25 μs or Cat-4 LBT subframe set may not perform LBT. For example, for a subframe in the middle of the multiple continuously scheduled subframes, even if it falls within the 25 μs or Cat-4 LBT subframe set, it is possible for the subframe not to perform LBT. The present disclosure does not define how a C-PDCCH specifically specifies a subframe set of an LBT type.

In one example of the mode 2, if the UL grant of the current subframe indicates the Cat-4 LBT, and UL grants of the subsequent two continuously scheduled subframes indicate No LBT or Cat-4 LBT. Current subframe falls within the 25 μs LBT subframe set, and the subsequent two subframes fall within the Cat-4 LBT subframe set, then the LBT type is determined according to Cat-4 LBT indicated by the UL grant of the current subframe. That is, in this case, although the current subframe falls within the 25 μs LBT subframe set indicated by the C-PDCCH, the UE does not perform 25 μs LBT, but perform Cat-4 LBT indicated by the UL grant for scheduling the current subframe.

In one example of the mode 1, the UL grant of the current subframe and the UL grants of the subsequent two continuously scheduled subframes all indicate No LBT, when the current subframe falls within the 25 μs LBT subframe set and the subsequent two subframes fall within the Cat-4 LBT subframe set, the most conservative LBT type for these continuously scheduled subframes are Cat-4 LBT.

In an example of the mode 3, the UL grant of the current subframe indicates Cat-4 LBT, and the UL grants of the subsequent two continuously scheduled subframes indicate No LBT or Cat-4 LBT, when the current subframe falls within the 25 μs LBT subframe set, and the subsequent two subframes fall within the Cat-4 LBT subframe set, the LBT type of the current subframe is 25 μs LBT indicated by the C-PDCCH, but the next subframe can not be transmitted directly without LBT, and the next subframe should perform Cat-4 LBT according to an indication by the C-PDCCH. Although the base station does not reserve a gap between the current subframe and the next subframe when performing scheduling, but the UE should blank the first symbol in the next subframe to perform Cat-4 LBT.

Figure 6:
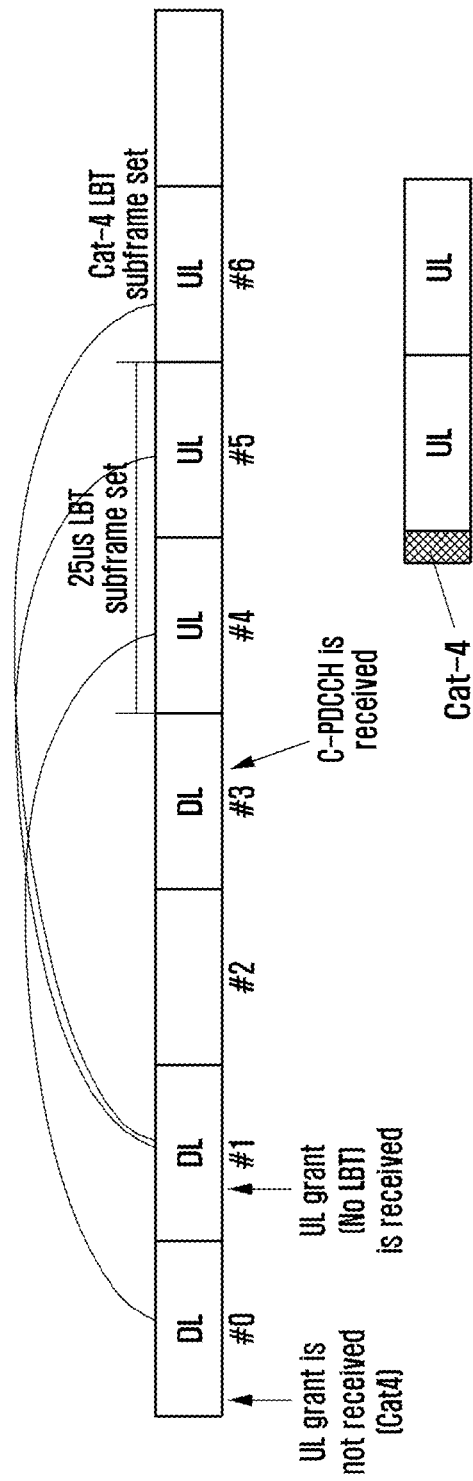
FIG. 6 is still another schematic diagram showing how a UE determines an LBT type when the UE has not received a UL grant of a previous subframe.

As shown in FIG. 6, the base station transmits the UL grant for scheduling uplink subframe #4 in subframe #0, where the indicated LBT type is Cat-4 LBT. The base station transmits the UL grant for scheduling uplink subframes #5 and #6 in subframe #1, where the indicated LBT type is No LBT. That is, the base station expects to schedule the UE to continuously transmit PUSCHs in subframes #4 to #6. The UE does not detect a UL grant in subframe #0, detects UL grants for scheduling subframe #5 and subframe #6 in subframe #1 (there is no gap between these two subframes), and detects a C-PDCCH in downlink subframe #3, where it is indicated that subframes #4 and #5 fall within the 25 μs LBT subframe set, and subframe #6 is within the Cat-4 LBT subframe set. Then, the UE may determine that subframe #5 and subframe #6 belong to different LBT subframe sets, so that the UE can not perform 25 μs LBT indicated by the C-PDCCH for subframe 5, but instead the UE performs Cat-4 LBT for subframe 5, and if LBT is passed, the UE can continuously transmit PUSCHs of subframe #5 and subframe #6.

Figure 16:
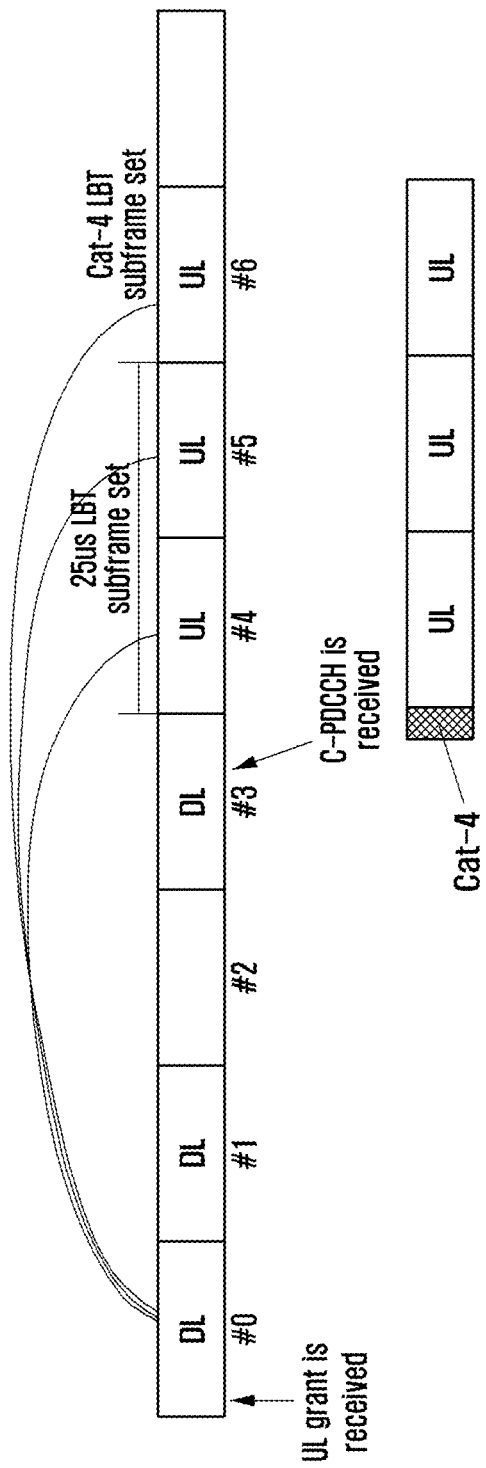
FIG. 16 is a schematic diagram showing how a UE determines an LBT type during multi-subframe scheduling according to Embodiment 2 of the present disclosure.
Figure 17:
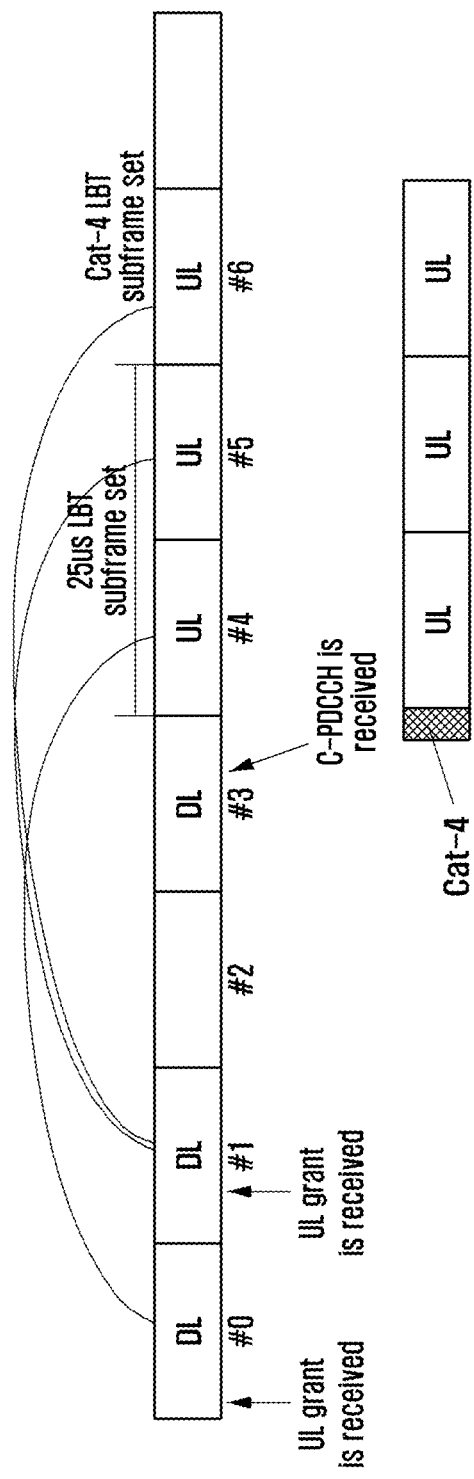
FIG. 17 is a schematic diagram showing how a UE determines an LBT type when C-PDCCH contains an LBT indication.

Similarly, for multi-subframe scheduling, as shown in FIG. 16, the base station transmits the UL grant for scheduling uplink subframes #4 to #6 in the subframe #0, where the indicated LBT type is Cat-4 LBT. There is no gap between these subframes. The UE detects a UL grant in subframe #0 and detects a C-PDCCH in downlink subframe #3, where it is indicated that subframes #4 and #5 fall within the 25 μs LBT subframe set, subframe #6 falls within the Cat-4 LBT subframe set. Then, the UE may determine that subframes #4, #5 and #6 belong to different LBT subframe sets. Therefore, according to the mode 2, the UE can not perform 25 μs LBT indicated by the C-PDCCH for subframe #4, but the UE should perform Cat-4 LBT for subframe #4, and if LBT is passed, PUSCHs of subframes #5 and subframe #6 can be continuously transmitted.

Figure 11:
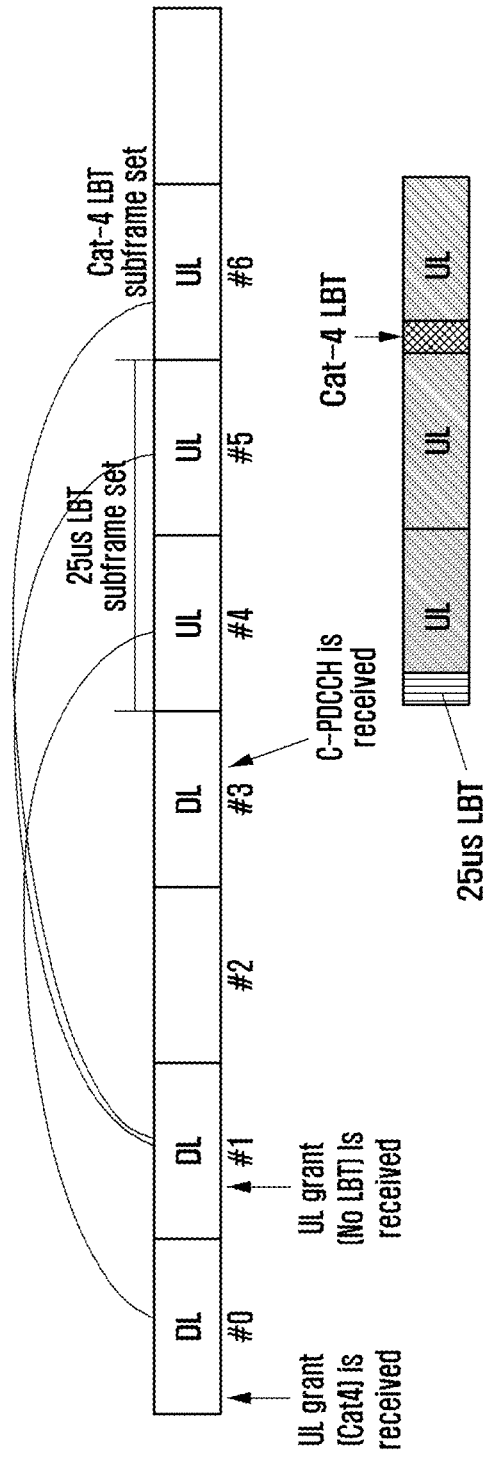
FIG. 11 is a schematic diagram showing how a UE determines an LBT type when a UL grant contains an LBT indication and the UE has received a UL grant of a previous subframe.

As shown in FIG. 11, the base station transmits the UL grant for scheduling uplink subframe #4 in subframe #0, where the LBT type indicated by the UL grant is Cat-4 LBT. The base station transmits the UL grants for scheduling uplink subframes #5 and #6 in subframe #1. The UE detects the UL grant in subframe #0, detects UL grants for scheduling subframe #5 and subframe #6 in subframe #1 (there is no gap between the three subframes), and detects the C-PDCCH in downlink subframe #3, where it is indicated that subframes #4 to #5 fall within the 25 μs LBT subframe set and subframe #6 falls within the Cat-4 LBT subframe set. Then, according to the mode 3, the UE performs LBT in subframe #4 according to 25 μs indicated by the C-PDCCH. If LBT is passed, the UE starts to transmits PUSCHs from subframe #4 until subframe #5. The PUSCHs of the two subframes are consecutive, and no LBT is required in the middle of them. But for subframe #6, Cat-4 LBT should be performed, and the PUSCH starting position is #1 symbol.

Mode 4: The LBT type of the current subframe is determined according to an indication by a C-PDCCH, but the first subsequent subframe which does not belong to a subframe set of the same LBT type with the current subframe is dropped.

For example, the UE detects multi-subframe scheduling signaling in subframe n, multi-subframe scheduling signaling schedules 4 consecutive uplink subframes without any gap (subframes n+8 to n+11) between them, and indicates that the LBT type is Cat-4 LBT. Then, the UE detects a C-PDCCH in subframe n+7, indicating that a MCOT ends at subframe n+9, i.e. subframe n+9 and the previous subframes is within the MCOT, and the subframes after subframe n+9 is outside of the current MCOT. Then, the UE can perform 25 μs LBT before subframe n+8 starts, and if LBT is passed, subframe n+8 and subframe n+9 can be transmitted continuously, and subframe n+10 and subframe n+11 are dropped.

Preferably, if the UE receives subframe n containing a C-PDCCH which can indicate 25 μs or Cat-4 LBT information, and k subframes between subframe n and subframe n+k in which uplink transmission is performed is larger than or equal to the minimum processing delay k' of the UE, the UE may re-determine the number of uplink subframes M2 that can be transmitted according to a subframe where aperiodic CSI (A-CSI) and/or SRS is located and/or a subframe where whether the last symbol is shortened.

Further, it is assumed that the number of uplink subframes scheduled by multi-subframe scheduling is M1, and that the UE determines the number of uplink subframes that can be transmitted is M2 according to the C-PDCCH, where M1>=M2. Assume that a subframe to transmit A-CSI is determined to be $I_1$ according M1. If the subframe $I_1$ is after the M2 subframes that can be transmitted, for example, M1=4, and M2=2, the subframe $I_1$ is the last but one subframe in the M1=4 subframes, then the subframe $I_1$ is after the M2=2 subframes, and the UE cannot transmit it. In this case, the subframe 12 for A-CSI transmission is determined by one of the following modes:

Mode 1: If M2=2, the A-CSI is sent in the second subframe. If M2>2, A-CSI is sent in the last but one subframe. For example, if M2=3, then A-CSI is transmitted in the second subframe. If M2=1, A-CSI is transmitted in the first subframe.

Mode 2: If M2=2, A-CSI is transmitted in the second subframe. If M2>2, A-CSI is transmitted in the last but one subframe. For example, if M2=3, then A-CSI is transmitted in the second subframe. If M2=1, A-CSI will not be transmitted.

Mode 3: If M2>0, A-CSI is transmitted in the last subframe of the M2 subframes.

Mode 4: If M2>1, A-CSI is transmitted in the last subframe of the M2 subframes. If M2=1, A-CSI will not be transmitted.

Note that in the above four modes, it is assumed that a time difference between the subframe $I_2$ for transmitting A-CSI and a subframe where the C-PDCCH is received is larger than or equal to the minimum processing delay k' of the UE. If the time difference is less than this minimum processing delay, the UE can only discard A-CSI, and transmission of PUSCHs in the M2 subframes is generated based on the assumption that there is no A-CSI. Usually, the minimum processing delay k'=4.

Figure 20:
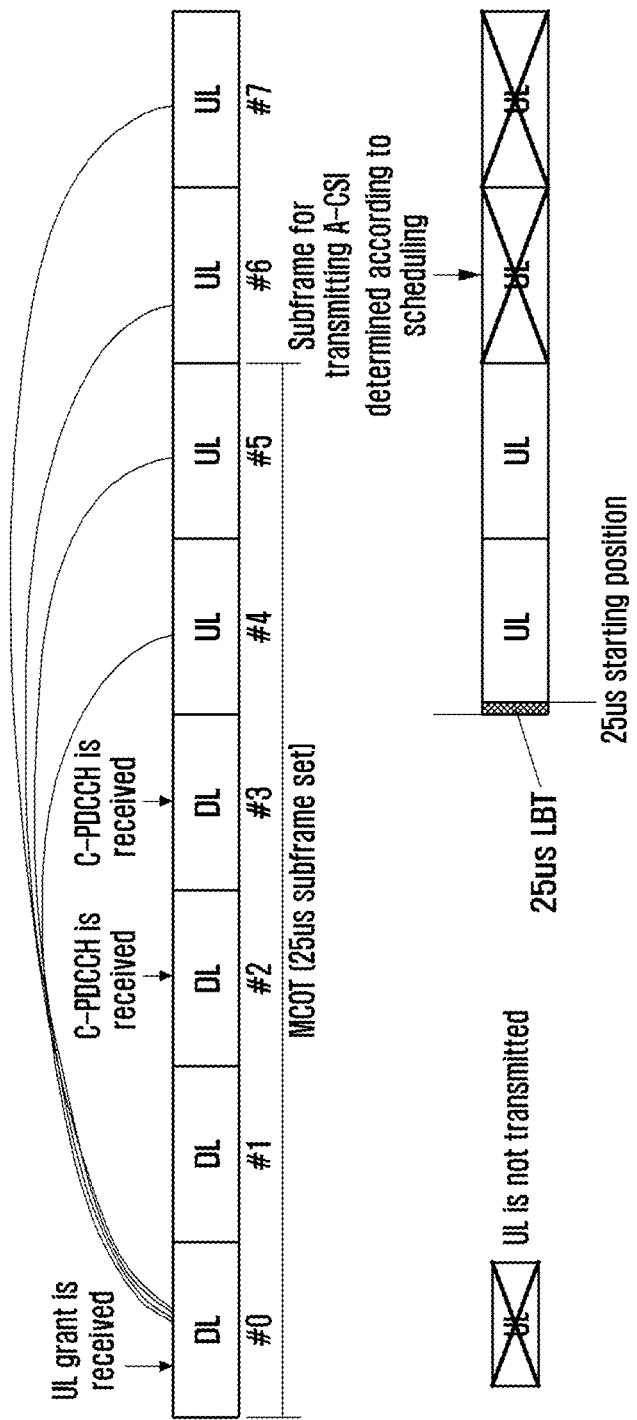
FIG. 20 is a schematic diagram showing how a UE determines an A-CSI transmission subframe according to the present disclosure.

As shown in FIG. 20, the UE receives multi-subframe scheduling signaling in subframe 0, indicating that uplink transmission of subframes 4 to 7, and that there is no gap between the subframes, which triggers aperiodic A-CSI transmission, i.e., transmission being performed in the third subframe (subframe 6). Then, M1=4. The UE also receives a C-PDCCH in subframe 2/3, indicating that uplink subframes start from subframe 4, and that the MCOT ends at subframe 5, then M2=2. The UE performs 25 μs LBT before subframe 4 starts, and continuously transmits subframe 4 and subframe 5 after LBT succeeds, and does not transmit subframe 6 and subframe 7. Subframe 6 for transmitting A-CSI determined according to M1 can not be transmitted. According to the mode 3, a subframe for transmitting A-CSI determined according to M2 is subframe 5. However, since a delay from subframe 2 where the C-PDCCH is received to subframe 5 is 3 which is less than the minimum delay 4, the UE does not transmit A-CSI. PUSCHs of subframes 4 and 5 are determined according to scheduling signaling received in subframe 0, i.e., regardless of the influence of transmission of A-CSI.

Figure 21:
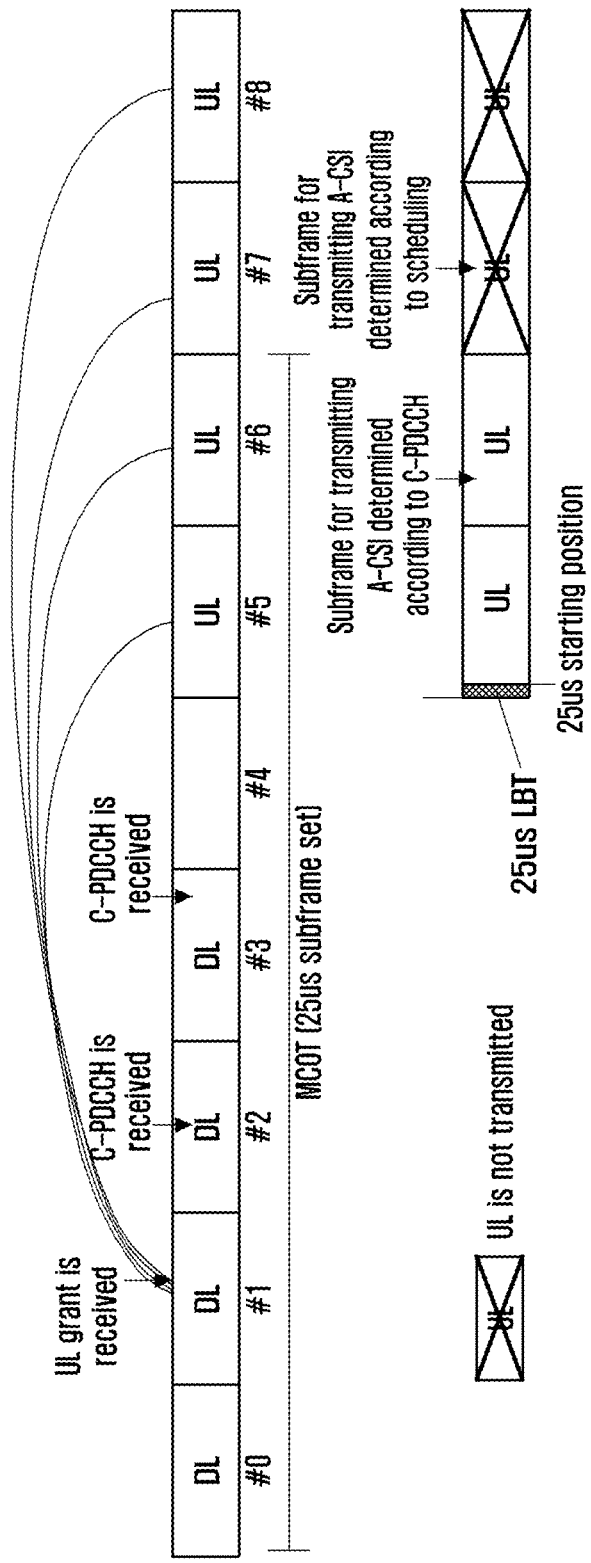
FIG. 21 is another schematic diagram showing how a UE determines an A-CSI transmission subframe according to the present disclosure.

As shown in FIG. 21, the UE receives multi-subframe scheduling signaling in subframe 0, indicating that uplink transmission of subframes 5 to 8 is scheduled, and that there is no gap between the subframes, which triggers A-CSI transmission, i.e., performing transmission in the third subframe (subframe 7). Then, M1=4. The UE also receives a C-PDCCH in subframe 2/3, indicating that uplink subframes start from subframe 5, and that the MCOT ends at subframe 6, then M2=2. The UE performs 25 μs LBT before subframe 5 starts, and continuously transmits subframe 5 and subframe after LBT succeeds, and does not transmit subframe 7 and subframe 8. Subframe 7 for transmitting A-CSI determined according to M1 can not be transmitted. According to the mode 3, a subframe for transmitting A-CSI determined according to M2 is subframe 6. Since a delay from subframe 2 where the C-PDCCH is received to subframe 6 is 4 which is exactly equal to the minimum delay 4, the UE may transmit A-CSI in subframe 6. The PUSCH of subframe 5 is determined according to scheduling signaling received in subframe 0, i.e., regardless of the influence of transmission of A-CSI, the PUSCH of subframe 6 carries A-CSI, and the UE needs to re-prepare bits.

If the MCS of the PUSCH containing A-CSI needs to be adjusted, for example, the MCS needing to be decreased or unchanged according to a predefined rule, then the MCS of the PUSCH of the subframe containing A-CSI newly determined is adjusted.

Further, assume that the number of uplink subframes scheduled by multi-subframe scheduling signaling is M1, and that the UE determines the number of uplink subframes that can be transmitted by the C-PDCCH is M2, where M1>=M2. Assume that a subframe to transmit SRS determined according to M1 is subframe $I_1$. If subframe $I_1$ is after the M2 uplink subframes that can be transmitted, e.g., M1=4, M2=2, and an SRS subframe offset configured by higher layer is 3, then subframe $I_1$ of the SRS determined according to M1 is the fourth subframe, after the M2=2 subframes, and the UE cannot transmit subframe $I_1$. In this case, M2 is modulated according to the subframe of the SRS configured by a higher layer, and subframe $I_2$ for transmitting the SRS is the first subframe.

Note that in this mode, it is assumed that a time difference between the newly determined subframe $I_2$ for transmitting the SRS and the subframe where the C-PDCCH is received is larger than or equal to the minimum processing delay k' of the UE. If the time difference is less than this minimum processing delay, the UE can only discard transmission of the SRS, and PUSCHs in the M2 subframes are transmitted based on an assumption that there is no SRS.

Further, assume that the number of uplink subframes scheduled by multi-subframe scheduling signaling is M1, and the UE determines that the number of uplink subframes that can be transmitted is M2 according to the C-PDCCH, where M1>M2. The last symbol of the M2 subframes can be determined according to the following two modes, Mode 1: the last symbol is not blanked. That is, the last symbol of the $M2^{th}$ subframe is not blanked regardless whether the last symbol indicated in multi-subframe scheduling signaling is blanked. If the last symbol of the $M2^{th}$ subframe is indicated for SRS, the last symbol of PUSCH needs to be blanked, for SRS transmission. If the last symbol of the $M2^{th}$ subframe is not indicated for the SRS, the last symbol is also used for PUSCH mapping.

Mode 2: The last symbol is determined to be blanked according to whether the last symbol is blanked indicated by multi-subframe scheduling signaling. That is, if the last symbol indicated in multi-subframe scheduling signaling is blanked, the last symbol of the $M2^{th}$ subframe needs to be blanked and no PUSCH can be transmitted. Whether it can be used for SRS transmission is determined according to SRS indication.

Note that in multi-subframe scheduling, whether the last symbol of the last subframe of the multiple subframes scheduled needs to be blanked is indicated explicitly in scheduling signaling. When the number of subframes that the UE can actually transmit M2<the number of scheduled subframes M1, the last symbol of the last subframe can be determined according to the mode 1 and the mode 2.

Note that in the mode 2, it is assumed that the time difference between the last subframe $I_2$ that can be transmitted determined based on the C-PDCCH and the subframe where the C-PDCCH is received is larger than or equal to the minimum processing delay k' of the UE. If the time difference is less than this minimum processing delay, the UE still determines the PUSCH in a manner that the last symbol is not blanked.

(1.2) If the UL grant contains an LBT indication, and the UE does not receive a C-PDCCH containing LBT indication information.

Then, the UE determines the LBT type and the uplink signal starting position of the current subframe according to the LBT type indicated by UL grant that schedules the current subframe.

(2) If only the C-PDCCH contains the LBT indication, then the UE may determine the LBT type and/or the PUSCH starting position of the current subframe according to LBT information indicated by the C-PDCCH, and whether UL grants/a UL grant of a subsequent one or more subframes is/are received, and whether there is a gap between the current subframe and a subsequent subframe.

The UE may receive multiple C-PDCCHs indicating the LBT type of the current subframe. For example, the UE receives a C-PDCCH in subframe #n, indicating that subframe #n+k belong to the Cat-4 LBT subframe set, and also receives a C-PDCCH in subframe #n+$k_1$($k_1$<k), indicating that subframe #n+k belongs to 25 μs LBT subframe set. The C-PDCCH received in subframe #n+$k_1$ is call the newly received C-PDCCH.

Then, similarly to (1), the UE needs to determine whether there is an adjacent uplink subframe after the current subframe without any gap is scheduled (the UE detects corresponding scheduling signaling), and if there is such a subframe and the subsequent subframe belong to subframe sets of different LBT types, then the LBT type of the current subframe may be determined according to one of the following modes, or otherwise, the LBT type of the current subframe is determined according to LBT indicated by the C-PDCCH newly received.

Mode 1: The LBT type of the current subframe is determined according to the most conservative LBT type of these continuously scheduled subframes and the PUSCH starting position of the current subframe is the PUSCH starting position indicated by the UL grant.

Mode 1 is same to the mode 1 in (1), but there is an exception.

Mode 2: The LBT type of the current subframe is determined according to the LBT type indicated by the C-PDCCH before the latest C-PDCCH, and the PUSCH starting position of the current subframe is the PUSCH starting position indicated by the UL grant.

Mode 3: The LBT type of the current subframe is determined according to an indication of the newly received C-PDCCH, but the first subframe of the subsequent subframes which does not fall within a subframe set of the same LBT type with the current subframe is also determined according to the indication of the newly received C-PDCCH, and the PUSCH starting position of this subframe is a predefined starting position. As shown in the mode 3 of (1) of the present embodiment.

Figure 18:
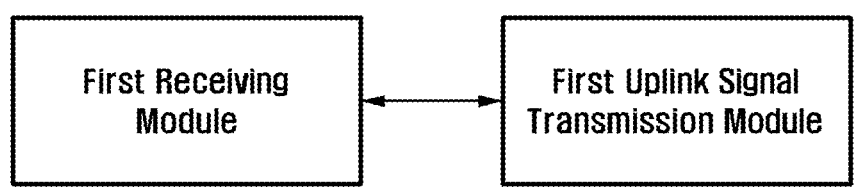
FIG. 18 is a schematic diagram of a structure of a user equipment according to the present disclosure.

As shown in FIG. 18, the base station transmits the UL grant of the scheduled subframe #4 in the subframe #0. The base station transmits the UL grant of the scheduled uplink subframes #5, 6 in the subframe #1. There is no gap between the three subframes, and the base station desires to schedule the UE to continuously transmit the PUSCH in subframes #4 to #6. Subframe #4 to subframe #6 belong to the Cat-4 LBT subframe set according to the LBT indicated by the previous C-PDCCH. But the base station sends a new C-PDCCH in subframe #3, indicating that subframes #4 to subframes #5 belong to the 25 μs LBT subframe set and subframe #6 belongs to the Cat-4 LBT subframe set. The UE detects UL grant in subframe #0, UL grant of scheduling subframe #5 and subframe #6 is detected in subframe #1 (there is no gap between the two subframes), and the new subframe #3 detects the new 0f the C-PDCCH. Then, the UE performs LBT according to the Cat-4 indicated by the previous C-PDCCH in the subframe #4 without following the 25 μs LBT indicated by the newly received C-PDCCH. If LBT passes, the PUSCH is transmitted from subframe #4 until subframe #6. The PUSCH of the two subframes is consecutive and no LBT is required in the middle. Multi-subframe scheduling is the same.

Step 1503: LBT is performed on the current subframe according to the determined LBT type, and if the LBT is passed, the PUSCH is transmitted from the starting position of the determined PUSCH in the current subframe; if the LBT fails, the PUSCH is not transmitted in the current subframe.

It is to be noted that the multiple consecutive uplink subframes without a gap starting from the current subframe described in the present disclosure refer to subframes UL grants of which have been properly demodulated before LBT of the current subframe. For example, the base station expects to schedule subframes #n to #n+4, but the UE only demodulates UL grants for scheduling subframes #n to #n+3 before transmitting subframe #n, then the UE only considers subframes #n to #n+3 when determining LBT of subframe #n.

Corresponding to the above-described embodiments, the present disclosure provides corresponding user equipments, respectively, which will be described below with reference to the accompanying drawings.

FIG. 18 is a structure of a user equipment. The user equipment includes a first receiving module and a first uplink signal transmission module, in which:

The first receiving module is used to receive scheduling signaling, in which scheduling signaling at least includes LBT indication information.

The first uplink signal transmission module is used to determine an LBT type of a current subframe based on scheduling signaling of the current subframe, and/or scheduling signaling of a previous subframe, and/or scheduling signaling of a subsequent subframe, and transmit an uplink signal in an uplink carrier. The UE performs a CCA detection before it transmits the uplink signal, if the determined LBT type requires the UE to carry out the CCA detection; and if the CCA detection is passed, the uplink signal is transmitted, otherwise the transmission is dropped. Before the uplink signal is transmitted, if the determined LBT type does not require the UE to carry out the CCA detection, the UE transmits the uplink signal directly.

What is claimed is:

1. A method performed by a user equipment (UE), the method comprising:
receiving, from a base station, an uplink grant (UL grant) scheduling uplink transmission, wherein the UL grant includes an indication for a first channel access type;
detecting information included in downlink control information (DCI), wherein the DCI includes an indication for a second channel access type; and
performing a listen-before-talk (LBT) procedure for the uplink transmission in a scheduled subframe based on the indication for the second channel access type irrespective of the first channel access type in case that the information included in the DCI is detected and an end of the uplink transmission occurs in or before a subframe identified based on the information.

2. The method of claim 1, wherein the first channel access type is Cat-4 LBT.

3. The method of claim 1, wherein the second channel access type is 25 μs LBT.

4. A user equipment (UE) comprising:
a transceiver configured to transmit and receive at least one signal; and
at least one processor coupled to the transceiver, and configured to:
receive, from a base station, an uplink grant (UL grant) scheduling uplink transmission, wherein the UL grant includes an indication for a first channel access type,
detect information included in downlink control information (DCI), wherein the DCI includes an indication for a second channel access type, and
perform a listen-before-talk (LBT) procedure for uplink transmission in a scheduled subframe based on the indication for the second channel access type irrespective of the first channel access type in case that the information included in the DCI is detected and an end of the uplink transmission occurs in or before a subframe identified based on the information.

5. The UE of claim 4, wherein the first channel access type is Cat-4 LBT.

6. The UE of claim 4, wherein the second channel access type is 25 μs LBT.

* * * * *